US012795577B2

(12) United States Patent
Sun

(10) Patent No.: US 12,795,577 B2
(45) Date of Patent: Nov. 10, 2026

(54) COMMUNICATION METHOD, APPARATUS, AND SYSTEM

(71) Applicant: HUAWEI TECHNOLOGIES CO., LTD., Shenzhen (CN)

(72) Inventor: Haiyang Sun, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 694 days.

(21) Appl. No.: 18/047,253

(22) Filed: Oct. 17, 2022

(65) Prior Publication Data

US 2023/0061152 A1 Mar. 2, 2023

Related U.S. Application Data

(63) Continuation of application No. PCT/CN2021/073131, filed on Jan. 21, 2021.

(30) Foreign Application Priority Data

Apr. 20, 2020 (CN) ........................ 202010310943.X

(51) Int. Cl.
*H04W 60/00* (2009.01)
*H04W 8/00* (2009.01)
*H04W 8/02* (2009.01)

(52) U.S. Cl.
CPC ........... *H04W 60/00* (2013.01); *H04W 8/005* (2013.01); *H04W 8/02* (2013.01)

(58) Field of Classification Search
CPC ....... H04W 60/00; H04W 8/005; H04W 8/02; H04W 8/14; H04W 8/20; H04W 24/02
See application file for complete search history.

(56) References Cited

U.S. PATENT DOCUMENTS

2019/0158408 A1* 5/2019 Li ......................... H04W 72/56
2021/0037375 A1* 2/2021 Cakulev ................ H04W 8/186

FOREIGN PATENT DOCUMENTS

CN 109673005 A 4/2019
CN 110933711 A 3/2020
(Continued)

OTHER PUBLICATIONS

SA WG2 Meeting #118bis,S2-170123,Service based procedures on Policy Control,Huawei, HiSilicon,Jan. 16-20, 2017, Spokane, US,total 10 pages.
(Continued)

*Primary Examiner* — Marcus Hammonds

(57) ABSTRACT

A communication method, apparatus and system are provided. The method includes: A first network element receives, from an application function network element, a first request for requesting to obtain information about a first policy control network element, where the first policy control network element is a policy control network element that provides mobility management.
The first network element sends the information about the first policy control network element to the application function network element. Based on this solution, the application function network element obtains the information about the first policy control network element from the first network element, and the application function network element may further send input information to the first policy control network element, so that the first policy control network element can select, based on the input information, an AM policy that matches a requirement of a currently running application.

19 Claims, 9 Drawing Sheets

(56) References Cited

FOREIGN PATENT DOCUMENTS

| | | | |
|---|---|---|---|
| WO | 2019137207 | A1 | 7/2019 |
| WO | 2019137546 | A1 | 7/2019 |

OTHER PUBLICATIONS

ZTE, "3GPP TSG-SA/WG2 Meeting #136-AH S2-2001458", Solution to KI#1: Discovery of Edge Application Server,Jan. 17, 2020,total 4 pages.

3GPP TS 23.501 V16.4.0:"3rd Generation Partnership Project; Technical Specification Group Services and System Aspects;System architecture for the 5G System (5GS);Stage 2(Release 16)",Mar. 2020,total 430 pages.

Ericsson, "SA WG2 Meeting #138E S2-2002724", Discussion on dynamically changing AM policies in the 5G,Apr. 10, 2020,total 5 pages.

3GPP TS 23.502 V16.4.0 :"3rd Generation Partnership Project;Technical Specification Group Services and System Aspects;Procedures for the 5G System (5GS);Stage 2(Release 16)",Mar. 2020,total 582 pages.

3GPP TS 23.503 V16.4.1:"3rd Generation Partnership Project;Technical Specification Group Services and System Aspects;Policy and charging control framework for the5G System (5GS);Stage 2(Release 16)",Apr. 2020,total 115 pages.

3GPP TS 29.500 V16.3.0 3rd Generation Partnership Project;Technical Specification Group Core Network and Terminals;5G System;Technical Realization of Service Based Architecture;Stage 3(Release 16) Mar. 2020 total 65 pages.

3GPP TS 33.501 V16.2.0 (Mar. 2020), 3rd Generation Partnership Project; Technical Specification Group Services and System Aspects; Security architecture and procedures for 5G system(Release 16), 227 pages.

SA WG2 Meeting #137-E,S2-2002195,Discussion on dynamically changing AM policies in the 5GC,Telstra, Vodafone,Feb. 24-27, 2020,total 4 pages.

3GPP TSG-WG SA2 Meeting #137E e-meeting,S2-2002599,New WID on Dynamically Changing AM Policies in the 5GC ,Orange, Telstra, Charter Communications, ATandT, Verizon UK Ltd,Elbonia, Feb. 24 27, 2020,total 3 pages.

SA WG2 Meeting #138E,S2-2002724,Discussion on dynamically changing AM policies in the 5GC,Ericsson,Apr. 20 24, 2020, Elbonia,total 5 pages.

SA WG2 Meeting #S2-138E,S2-2003140,Multi PCF architecture forDynamically Changed AM Policies in 5GC,Apr. 20-24, 2020, Electronic meeting,total 6 pages.

* cited by examiner

COMMUNICATION METHOD, APPARATUS, AND SYSTEM

CROSS-REFERENCE TO RELATED APPLICATIONS

This application is a continuation of International Patent Application No. PCT/CN2021/073131 filed on Jan. 21, 2021, which claims priority to Chinese Patent Application No. 202010310943.X filed on Apr. 20, 2020. The disclosures of the aforementioned applications are hereby incorporated by reference in their entireties.

TECHNICAL FIELD

This disclosure relates to the field of communication technologies, and in particular, to a communication method, an apparatus, and a system.

BACKGROUND

A policy control function (PCF) network element selected by an access and mobility management function (AMF) network element is referred to as an AM PCF network element, and the AM PCF network element may dynamically generate an access and mobility (AM) policy.

Currently, when the AM PCF network element generates the AM policy, some input information (for example, a preferred access frequency of a current application) of an application function (AF) network element is not used. As a result, the AM policy selected by the AM PCF network element is irrelevant to a service of a currently running application, that is, the AM PCF network element generates an AM policy that does not match a requirement of the currently running application.

To enable the AM PCF network element to select an AM policy that matches the requirement of the currently running application, operators propose that the AF network element can invoke a service of the AM PCF network element, and provide, for the AM PCF network element, some input information for selecting the AM policy, so that the AM PCF network element can use the input information from the AF network element, to select the AM policy that matches the requirement of the currently running application.

A premise on which the AF network element may send the input information to the AM PCF network element is that the AF network element may select or discover an AM PCF network element that serves a terminal device. However, in an existing mechanism, there is no corresponding method for the AF network element to discover the AM PCF network element that serves the terminal device.

SUMMARY

This disclosure provides a communication method, an apparatus, and a system that provides an AF network element to obtain information about an AM PCF network element.

According to a first aspect, an embodiment provides a communication method. The method includes a first network element receives, from an application function network element, a first request for requesting to obtain information about a first policy control network element, where the first policy control network element is a policy control network element that provides mobility management. The first network element sends the information about the first policy control network element to the application function network element.

Based on the foregoing solution, the application function network element obtains the information about the first policy control network element from the first network element, and the application function network element may further send input information to the first policy control network element, so that the first policy control network element can select, based on the input information, an AM policy that matches a requirement of a currently running application. This helps improve precision of the AM policy.

In a possible implementation, the first network element receives a first registration request from the first policy control network element. The first registration request includes first registration information. The first registration information includes the information about the first policy control network element and identification information of a terminal device. The second request is used to request to register the first registration information to the first network element. The first network element receives a second registration request from a second policy control network element. The second registration request includes second registration information. The second registration information includes information about the second policy control network element, the identification information of the terminal device, and an address of the terminal device. The second request is used to request to register the second registration information to the first network element. The second policy control network element is a policy control network element that provides session management. The first network element establishes an association between the first registration information and the second registration information based on the identification information of the terminal device.

Based on the foregoing solution, the first policy control network element registers, to the first network element, the first registration information corresponding to the first policy control network element, the second policy control network element registers, to the first network element, the second registration information corresponding to the second policy control network element, and then the first network element establishes the association between the first registration information and the second registration information. When the application function network element subsequently requests the first network element for obtaining the information about the first policy control network element, the first network element first finds the second registration information based on a request from the application function network element, then finds the first registration information, and sends, to the AF, the information about the first policy control network element in the first registration information. The application function network element may further send input information to the first policy control network element, so that the first policy control network element can select, based on the input information, an AM policy that matches a requirement of a currently running application. This helps improve precision of the AM policy.

In a possible implementation, the first request includes the address of the terminal device and a policy-control-network-element type, and the policy-control-network-element type indicates a policy control network element that provides mobility management. The first network element determines the second registration information based on the address of the terminal device; and obtains the information about the first policy control network element from the first registration information associated with the second registration information.

Based on the foregoing solution, the application function network element sends the first request carrying the policy-control-network-element type, to indicate to request the policy control network element that provides mobility management, so that the first network element can obtain the information about the first policy control network element from stored registration information, thereby implementing accurate search.

In a possible implementation, the first network element receives a third registration request from a second policy control network element. The third registration request includes third registration information. The third registration information includes the information about the first policy control network element and an address of a terminal device. The third registration request is used to request to register the third registration information to the first network element. The second policy control network element is a policy control network element that provides session management.

Based on the foregoing solution, the second policy control network element may register, to the first network element, the registration information corresponding to the first policy control network element. Therefore, the application function network element may subsequently request the first network element for the information about the first policy control network element, and the application function network element may further send input information to the first policy control network element, so that the first policy control network element can select, based on the input information, an AM policy that matches a requirement of a currently running application. This helps improve precision of the AM policy.

In a possible implementation, the first request includes the address of the terminal device and a policy-control-network-element type, and the policy-control-network-element type indicates a policy control network element that provides mobility management. The first network element obtains the information about the first policy control network element from the third registration information corresponding to the address of the terminal device and the policy-control-network-element type.

Based on the foregoing solution, the application function network element sends the first request carrying the policy-control-network-element type, to indicate to request the policy control network element that provides mobility management, so that the first network element can obtain the information about the first policy control network element from stored registration information, thereby implementing accurate search.

In a possible implementation, the first network element receives a fourth registration request from a mobility management network element or the first policy control network element. The fourth registration request includes fourth registration information. The fourth registration information includes the information about the first policy control network element and identification information of a terminal device. The fourth registration request is used to request to register the fourth registration information to the first network element.

Based on the foregoing solution, the first policy control network element or the mobility management network element registers, to the first network element, the registration information corresponding to the first policy control network element. When the application function network element subsequently requests the first network element for obtaining the information about the first policy control network element, when the first network element identifies, based on a request from the application function network element, that the application function network element intends to obtain the information about the first policy control network element, the first network element finds the fourth registration information based on the identification information of the terminal device, and sends, to the application function network element, the information about the first policy control network element in the fourth registration information. The application function network element may further send input information to the first policy control network element, so that the first policy control network element can select, based on the input information, an AM policy that matches a requirement of a currently running application. This helps improve precision of the AM policy.

In a possible implementation, the first request includes the identification information of the terminal device. The first network element obtains the information about the first policy control network element from the fourth registration information corresponding to the identification information of the terminal device.

In a possible implementation, the first network element is a binding support function network element, a unified data management network element, or a unified data repository.

In a possible implementation, the first network element is a second policy control network element, and the second policy control network element is a policy control network element that provides session management. The second policy control network element receives the information about the first policy control network element from a session management network element.

According to a second aspect, an embodiment provides a communication method. The method includes: An application function network element sends, to a first network element, a first request for requesting to obtain information about a first policy control network element, where the first policy control network element is a policy control network element that provides mobility management. The application function network element receives the information about the first policy control network element from the first network element.

Based on the foregoing solution, the application function network element obtains the information about the first policy control network element from the first network element, and the application function network element may further send input information to the first policy control network element, so that the first policy control network element can select, based on the input information, an AM policy that matches a requirement of a currently running application. This helps improve precision of the AM policy.

In a possible implementation, the first request includes an address of a terminal device and a policy-control-network-element type, and the policy-control-network-element type indicates a policy control network element that provides mobility management. That the first request is used to request to obtain information about a first policy control network element includes: The first request is used to request to obtain the information that is about the first policy control network element and that corresponds to the address of the terminal device.

In a possible implementation, the first request includes an identifier of a terminal device. That the first request is used to request to obtain information about a first policy control network element includes: The first request is used to request to obtain the information that is about the first policy control network element and that corresponds to the identifier of the terminal device.

In a possible implementation, the first network element is a binding support function network element, a unified data management network element, a unified data repository, or a second policy control network element. The second policy control network element is a policy control network element that provides session management.

According to a third aspect, an embodiment provides a communication apparatus. The apparatus may be a first network element, or may be a chip used in the first network element. The apparatus has functions of implementing the first aspect or the possible implementations of the first aspect. The functions may be implemented by hardware, or may be implemented by hardware executing corresponding software. The hardware or the software includes one or more modules corresponding to the functions.

According to a fourth aspect, an embodiment provides a communication apparatus. The apparatus may be an application function network element, or may be a chip used in the application function network element. The apparatus has functions of implementing the second aspect or the possible implementations of the second aspect. The functions may be implemented by hardware, or may be implemented by hardware executing corresponding software. The hardware or the software includes one or more modules corresponding to the functions.

According to a fifth aspect, an embodiment provides a communication apparatus, including a processor and a memory. The memory is configured to store computer-executable instructions. When the apparatus runs, the processor executes the computer-executable instructions stored in the memory, to enable the apparatus to perform any method in the first aspect and the second aspect or the possible implementations of the first aspect and the second aspect.

According to a sixth aspect, an embodiment provides a communication apparatus, including units or means configured to perform the steps in any method in the first aspect and the second aspect or the possible implementations of the first aspect and the second aspect.

According to a seventh aspect, an embodiment provides a communication apparatus, including a processor and an interface circuit. The processor is configured to communicate with another apparatus through the interface circuit, and perform any method in the first aspect and the second aspect or the possible implementations of the first aspect and the second aspect. There are one or more processors.

According to an eighth aspect, an embodiment provides a communication apparatus, including a processor. The processor is configured to be connected to a memory, and invoke a program stored in the memory, to perform any method in the first aspect and the second aspect or the possible implementations of the first aspect and the second aspect. The memory may be located inside or outside the apparatus. In addition, there are one or more processors.

According to a ninth aspect, an embodiment provides a computer-readable storage medium. The computer-readable storage medium stores instructions. When the instructions are run on a computer, a processor is enabled to perform any method in the first aspect and the second aspect or the possible implementations of the first aspect and the second aspect.

According to a tenth aspect, an embodiment provides a computer program product. The computer program product includes a computer program. When the computer program is run, any method in the first aspect and the second aspect or the possible implementations of the first aspect and the second aspect is performed.

According to an eleventh aspect, an embodiment provides a chip system, including a processor. The processor is configured to perform any method in the first aspect and the second aspect or the possible implementations of the first aspect and the second aspect.

According to a twelfth aspect, an embodiment provides a communication system, including an application function network element and a first network element. The application function network element is configured to send, to a first network element, a first request for requesting to obtain information about a first policy control network element, where the first policy control network element is a policy control network element that provides mobility management. The first network element is configured to: receive the first request from the first network element, and send the information about the first policy control network element to the application function network element.

According to a thirteenth aspect, an embodiment provides a communication method. The method includes: An application function network element sends, to a first network element, a first request for requesting to obtain information about a first policy control network element, where the first policy control network element is a policy control network element that provides mobility management. The first network element receives the first request from the first network element, and sends the information about the first policy control network element to the application function network element.

BRIEF DESCRIPTION OF DRAWINGS

FIG. 2(*b*) is a schematic diagram of a point-to-point interface based 5G network architecture;

DESCRIPTION OF EMBODIMENTS

To make the objectives, technical solutions, and advantages of this disclosure more clear, the following further describes embodiments in detail with reference to the accompanying drawings. A specific operation method in a method embodiment may also be applied to an apparatus embodiment or a system embodiment. In the descriptions of this disclosure, unless otherwise specified, a plurality of means two or more than two.

Figure 1:
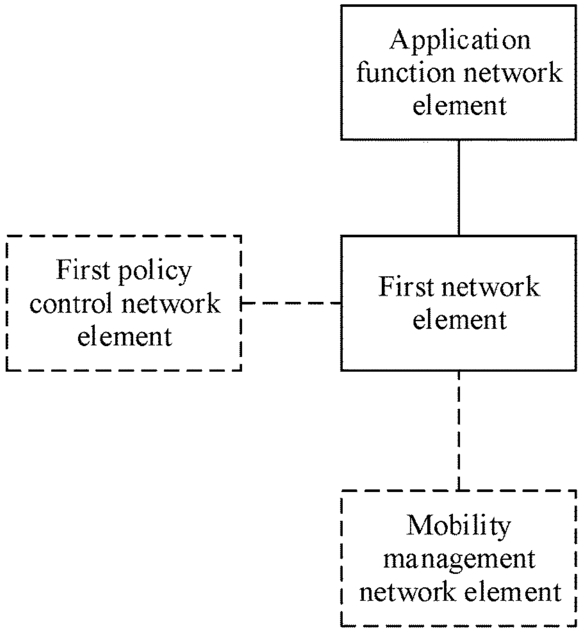
FIG. 1 is a schematic diagram of a communication system according to an embodiment.

To resolve the problem described in the background, as shown in FIG. 1, this disclosure provides a communication system including a first network element and an application function network element. Optionally, the system further includes a first policy control network element, and the first policy control network element is a policy control network element that provides mobility management. Optionally, the system further includes a mobility management network element.

The application function network element is configured to send, to the first network element, a first request for requesting to obtain information about the first policy control network element. The first network element is configured to: receive the first request from the first network element, and send the information about the first policy control network element to the application function network element.

In a possible implementation, the first network element is further configured to receive a first registration request from the first policy control network element, where the first registration request includes first registration information, the first registration information includes the information about the first policy control network element and identification information of a terminal device, and the second request is used to request to register the first registration information to the first network element; receive a second registration request from a second policy control network element, where the second registration request includes second registration information, the second registration information includes information about the second policy control network element, the identification information of the terminal device, and an address of the terminal device, the second request is used to request to register the second registration information to the first network element, and the second policy control network element is a policy control network element that provides session management; and establish an association between the first registration information and the second registration information based on the identification information of the terminal device.

In a possible implementation, the first request includes the address of the terminal device and a policy-control-network-element type, and the policy-control-network-element type indicates a policy control network element that provides mobility management. The first network element is further configured to: determine the second registration information based on the address of the terminal device; and obtain the information about the first policy control network element from the first registration information associated with the second registration information.

In a possible implementation, the first network element is further configured to receive a third registration request from a second policy control network element. The third registration request includes third registration information. The third registration information includes the information about the first policy control network element and an address of a terminal device. The third registration request is used to request to register the third registration information to the first network element. The second policy control network element is a policy control network element that provides session management.

In a possible implementation, the first request includes the address of the terminal device and a policy-control-network-element type, and the policy-control-network-element type indicates a policy control network element that provides mobility management. The first network element is further configured to obtain the information about the first policy control network element from the third registration information corresponding to the address of the terminal device and the policy-control-network-element type.

In a possible implementation, the first network element is further configured to receive a fourth registration request from a mobility management network element or the first policy control network element. The fourth registration request includes fourth registration information. The fourth registration information includes the information about the first policy control network element and identification information of a terminal device. The fourth registration request is used to request to register the fourth registration information to the first network element.

In a possible implementation, the first request includes the identification information of the terminal device. The first network element is further configured to obtain the information about the first policy control network element from the fourth registration information corresponding to the identification information of the terminal device.

In a possible implementation, the first network element is a binding support function network element, a unified data management network element, or a unified data repository.

In a possible implementation, the first network element is a second policy control network element, and the second policy control network element is a policy control network element that provides session management. The first network element is further configured to receive the information about the first policy control network element from a session management network element.

Specific implementations of the foregoing solution are described in detail in the following method embodiments.

Figure 2A:
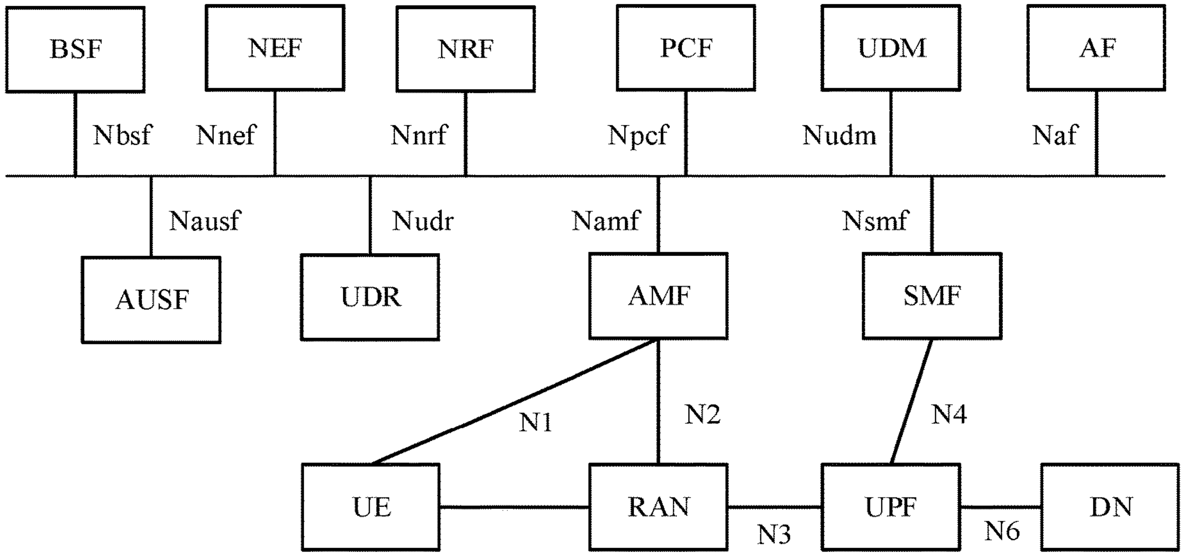
FIG. 2(*a*) is a schematic diagram of a service-based 5G network architecture.
Figure 2B:
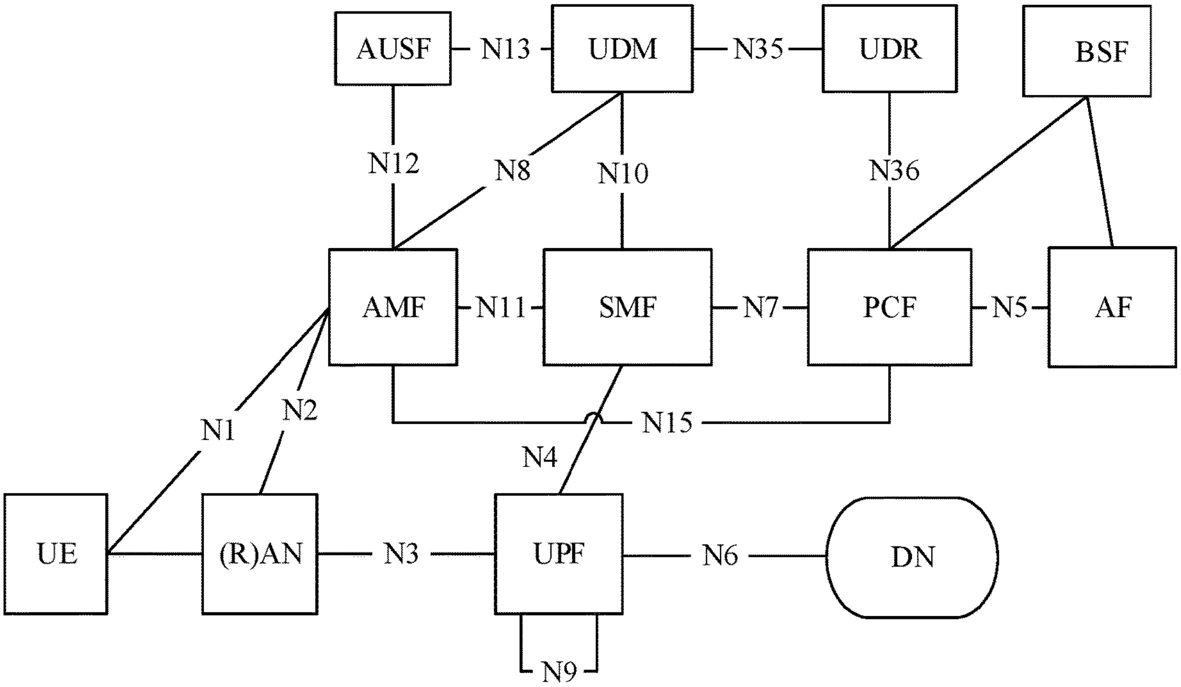

The system shown in FIG. 1 may be used in a 5th generation (5G) network architecture shown in FIG. 2(*a*) or FIG. 2(*b*), or certainly, may be used in a future network architecture, for example, a 6th generation (6G) network architecture. This is not limited in this disclosure.

For example, it is assumed that the communication system shown in FIG. 1 is used in a 5G network architecture. FIG. 2(*a*) is a schematic diagram of a service-based 5G network architecture. A network element or an entity corresponding to the first policy control network element in FIG. 1 may be a PCF network element in the 5G network architecture shown in FIG. 2(*a*), and a network element or an entity corresponding to the first network element in FIG. 1 may be a BSF network element, a unified data repository (UDR), a unified data management (UDM) network element, or a PCF network element in the 5G network architecture shown in FIG. 2(*a*). A network element or an entity corresponding to the mobility management network element in FIG. 1 may be an AMF network element in the 5G network architecture shown in FIG. 2(*a*).

The 5G network architecture shown in FIG. 2(*a*) may include three parts: a terminal device part, a data network (DN), and an operator network. The following briefly describes functions of some network elements.

The operator network may include one or more of the following network elements: an authentication server function (AUSF) network element, a network exposure function (NEF) network element, a PCF network element, a UDM, a UDR, a network storage function (NRF) network element, an AF network element, an AMF network element, a session management function (SMF) network element, a radio access network (RAN), a user plane function (UPF) network element, a binding support function (BSF) network element, and the like. In the foregoing operator network, a part other than the radio access network part may be referred to as a core network part.

During an implementation, the terminal device in embodiments of this disclosure may be a device configured to implement a wireless communication function. The terminal device may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. The terminal may be mobile or fixed.

The terminal device may establish a connection to the operator network through an interface (for example, N1) provided by the operator network, and use services such as a data service and/or a voice service provided by the operator network. The terminal device may further access the DN through the operator network, and use an operator service deployed on the DN and/or a service provided by a third party. The third party may be a service provider other than the operator network and the terminal device, and may provide services such as a data service and/or a voice service for the terminal device. A specific representation form of the third party may be specifically determined based on an actual application scenario, and is not limited herein.

The RAN is a sub-network of the operator network, and is an implementation system between a service node in the operator network and the terminal device. To access the operator network, the terminal device first passes through the RAN, and may be connected to the service node in the operator network through the RAN. A RAN device in this application is a device that provides the wireless communication function for the terminal device, and the RAN device is also referred to as an access network device. The RAN device in this application includes but is not limited to: a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmitting and receiving point (TRP), a transmitting point (TP), a mobile switching center, and the like.

The AMF network element mainly performs functions such as mobility management, and access authentication/authorization. In addition, the AMF network element is further responsible for transferring user policies between UE and a PCF.

The SMF network element mainly performs functions such as session management, execution of control policies delivered by the PCF, UPF selection, and UE internet protocol (IP) address allocation.

The UPF network element serves as an interface UPF of the data network, and implements functions such as user plane data forwarding, charging statistics based on a session/flow level, and bandwidth throttling.

The UDM network element is mainly responsible for functions such as subscription data management and user access authorization.

The UDR is mainly responsible for storage and retrieval of subscription data, policy data, application data, and other types of data.

The NEF network element is mainly configured to support capability and event exposure.

The AF network element is mainly responsible for transferring of requirements of an application side on a network side, for example, a quality of service (QoS) requirement or user status event subscription. The AF may be a third-party functional entity, or may be an operator-deployed application service, for example, an IP multimedia subsystem (IMS) voice call service.

The PCF network element is mainly responsible for policy and charging control for session and service data flows, QoS bandwidth guarantee, mobility management, UE policy decision, and the like.

The NRF network element may be configured to provide a network element discovery function and provide, based on a request from another network element, network element information corresponding to a network element type. An NRF further provides network element management services, for example, registration, update, and deregistration of a network element and subscription and push of a network element status.

The AUSF network element is mainly responsible for user authentication, to determine whether to allow a user or a device to access a network.

The BSF network element is configured to maintain a correspondence among identification information of a terminal device, a data network name (DNN), single network slice selection assistance information (S-NSSAI), an address (for example, an internet protocol (IP) address) of the terminal device, and information about the PCF network element.

The DN is a network outside the operator network. The operator network may access a plurality of DNs. A plurality of services may be deployed in the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like in the internal office network of the company.

Nausf, Nnef, Npcf, Nudm, Naf, Namf, Nsmf, Nbsf, N1, N2, N3, N4, and N6 in FIG. 2(*a*) are interface serial numbers. For meanings of the interface serial numbers, refer to definitions in the 3GPP standard protocols. This is not limited herein.

For example, it is assumed that the communication system shown in FIG. 1 is used in a 5G network architecture. FIG. 2(*b*) is a schematic diagram of a point-to-point interface based 5G network architecture. A network element or an entity corresponding to the first policy control network element in FIG. 1 may be a PCF network element in the 5G network architecture shown in FIG. 2(*b*), and a network element or an entity corresponding to the first network element in FIG. 1 may be a BSF network element, a UDR, a UDM network element, or a PCF network element in the 5G network architecture shown in FIG. 2(*b*). A network element or an entity corresponding to the mobility management network element in FIG. 1 may be an AMF network element in the 5G network architecture shown in FIG. 2(*b*).

For descriptions of functions of network elements in FIG. 2(*b*), refer to the descriptions of the functions of the corresponding network element in FIG. 2(*a*). Details are not described again. A main difference between FIG. 2(*b*) and FIG. 2(*a*) lies in that interfaces between the network elements in FIG. 2(*b*) are point-to-point interfaces rather than service-oriented interfaces.

In the architecture shown in FIG. 2(*b*), names and functions of the interfaces between the network elements are as follows:

(1) N7 represents an interface between the PCF and an SMF, and is configured to deliver a protocol data unit (PDU) session granularity control policy and a service data flow granularity control policy.

(2) N15 represents an interface between the PCF and the AMF, and is configured to deliver a UE policy and an access control related policy.

(3) N5 represents an interface between an AF and the PCF, and is configured to deliver an application service request and report a network event.

(4) N4 represents an interface between the SMF and a UPF, and is configured to transfer information between a control plane and a user plane, including delivery of a forwarding rule, a QoS control rule, a traffic statistics rule, and the like from the control plane to the user plane, and reporting of user plane information.

(5) N11 represents an interface between the SMF and the AMF, and is configured to: transfer PDU session tunnel information between a RAN and the UPF, transfer a control message to be sent to a UE, transfer radio resource control information to be sent to the RAN, and so on.

(6) N2 represents an interface between the AMF and the RAN, and is configured to transfer radio bearer control information and the like from a core network side to the RAN.

(7) N1 represents an interface between the AMF and the UE, is access-irrelevant, and is configured to transfer the QoS control rule and the like to the UE.

(8) N8 represents an interface between the AMF and a UDM, and is used by the AMF to obtain, from the UDM, subscription data and authentication data that are related to access and mobility management, and used by the AMF to register current mobility management related information of the UE with the UDM.

(9) N10 represents an interface between the SMF and the UDM, and is used by the SMF to obtain, from the UDM, subscription data related to session management, and used by the SMF to register current session related information of the UE with the UDM.

(10) N35 represents an interface between the UDM and the UDR, and is used by the UDM to obtain user subscription data information from the UDR.

(11) N36 represents an interface between the PCF and the UDR, and is used by the PCF to obtain policy related subscription data and application data related information from the UDR.

(12) N12 represents an interface between the AMF and an AUSF, and is used by the AMF to initiate an authentication procedure to the AUSF, where an SUCI may be carried as a subscription identifier.

(13) N13 represents an interface between the UDM and the AUSF, and is used by the AUSF to obtain a user authentication vector from the UDM, to perform the authentication procedure.

It may be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be implemented by a plurality of devices, or may be one function module in one device. This is not specifically limited in embodiments of this application.

The mobility management network element, the session management network element, the policy control network element, the application function network element, and the binding support function network element in this application may be respectively the AMF, the SMF, the PCF, the AF, and the BSF in FIG. 2(*a*) or FIG. 2(*b*), or may be network elements that have the functions of the AMF, the SMF, the PCF, the AF, and the BSF in a future communication network, for example, a 6th generation (6G) network. This is not limited in this application. For ease of description, in this application, descriptions are provided by using an example in which the mobility management network element, the session management network element, the policy control network element, the application function network element, and the binding support function network element are respectively the AMF, the SMF, the PCF, the AF, and the BSF.

In embodiments of this application, a PCF connected to an AMF may be referred to as an AM PCF, and the AM PCF is selected by the AMF. The AM PCF may provide an AM policy and a UE policy. The AM PCF serves terminal devices. In embodiments of this application, the AM PCF may also be referred to as a first PCF or a first policy control network element.

In embodiments of this application, a PCF connected to an SMF may be referred to as an SM PCF, and the SM PCF is selected by the SMF. The SM PCF may provide a session management (SM) policy. The SM PCF serves sessions (for example, a PDU session). In embodiments of this application, the SM PCF may also be referred to as a second PCF or a second policy control network element.

During actual deployment, the PCF (namely, the AM PCF) connected to the AMF and the PCF (namely, the SM PCF) connected to the SMF may be a same PCF, or may be different PCFs.

In embodiments of this application, an AF may directly interact with a network function (NF) of a 5G core network such as a PCF and a BSF, or may interact with the NF of the 5G core network such as the PCF and the BSF via an NEF. Optionally, the NEF may map, to an internal identifier (for example, an SUPI) of a terminal device, an external identifier (for example, a phone number) of the terminal device that is sent by the AF.

In embodiments of this disclosure, information about an AM PCF is information for identifying the AM PCF, and may include, for example, an address or an identifier of the AM PCF. Information about an SM PCF is information for identifying the SM PCF, and may include, for example, an address or an identifier of the SM PCF.

In embodiments of this disclosure, a first request sent by an AF to a first network element may also be referred to as a discovery request, for requesting to obtain information about an AM PCF.

Figure 3:
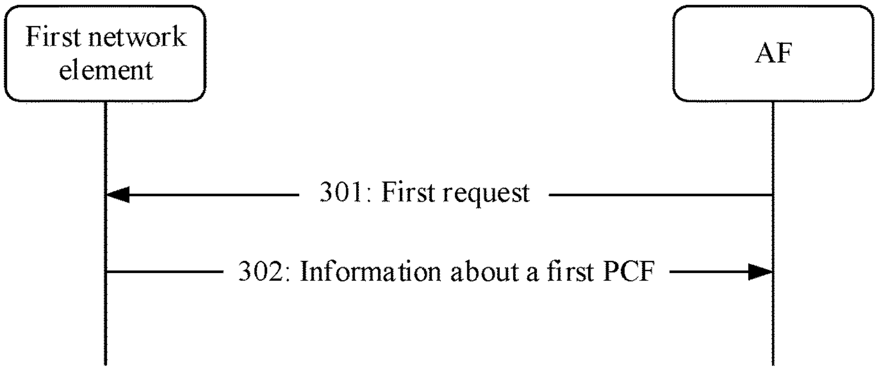
FIG. 3 is a schematic flowchart of a communication method according to an embodiment.

To resolve the problem discussed in the background, based on the network architecture shown in FIG. 2(*a*) or FIG. 2(*b*), this disclosure provides a communication method shown in FIG. 3. The method includes the following steps.

Step 301: An AF sends, to a first network element, a first request for requesting to obtain information about a first PCF. Correspondingly, the first network element may receive the first request.

The first PCF herein is also referred to as an AM PCF, and is selected by an AMF. The first PCF may provide mobility management, and therefore may provide an AM policy. Optionally, the first PCF may further provide terminal device management, and therefore may provide a terminal device policy.

Step 302: The first network element sends the information about the first PCF to the AF. Correspondingly, the AF may receive the information about the first PCF.

Based on the foregoing solution, the AF obtains the information about the first PCF from the first network element, and the AF may further send input information to the first policy control network element, so that the first policy control network element can select, based on the input information, an AM policy that matches a requirement of a currently running application. This helps improve precision of the AM policy.

The first network element stores the information about the first PCF. Therefore, when the AF requests the first network element to obtain the information about the first PCF, the first network element may provide the AF with the information about the first PCF. The following provides three different implementations.

Implementation 1: The first network element is a BSF, a UDM, or a UDR, and the first PCF or a second PCF registers the information about the first PCF to the first network element.

The second PCF herein is also referred to as an SM PCF, and is selected by an SMF. The second PCF may provide session management, and therefore may provide an SM policy.

The implementation 1 includes an implementation 1.1 and an implementation 1.2 below.

In the implementation 1.1, the second PCF registers the information about the first PCF to the first network element.

For example, the first network element may receive a registration request from the second PCF. The registration request includes registration information corresponding to the first PCF. The registration information includes the information about the first PCF and an address of a terminal device. The registration request is used to request to register the registration information to the first network element.

In addition, the first network element may further receive a registration request from the second PCF. The registration request includes registration information corresponding to the second PCF. The registration information includes information about the second PCF and the address of the terminal device. Optionally, the registration information further includes identification information of the terminal device, and the like.

Based on the implementation 1.1, the first request in step 102 may include the address of the terminal device and a PCF type. The PCF type indicates a PCF that provides mobility management. In this case, the first network element determines, based on the PCF type in the first request, that the information about the first PCF needs to be obtained. In this case, the first network element obtains the registration information corresponding to the first PCF, and obtains the information about the first PCF from the registration information. The registration information herein includes the address of the terminal device in the first request. That is, the first network element obtains the information about the first PCF from the registration information corresponding to the address of the terminal device and the PCF type.

In an example, the first network element stores the following information.

registration information of a PCF 1: information about the PCF 1, an address of UE 1, and a PCF type 1;

registration information of a PCF 2: information about the PCF 2, the address of the UE 1, and a PCF type 2;

registration information of a PCF 3: information about the PCF 3, an address of UE 2, and the PCF type 1;

registration information of a PCF 4: information about the PCF 4, the address of the UE 2, and the PCF type 2;

registration information of a PCF 5: information about the PCF 5, an address of UE 3, and the PCF type 1; and registration information of a PCF 6: information about the PCF 6, the address of the UE 3, and the PCF type 2.

The PCF type 1 indicates a PCF that provides mobility management, and the PCF type 2 indicates a PCF that provides session management.

Assuming that the first request carries the address of the UE 2 and the PCF type 1, the first network element obtains the information about the PCF 3 from the registration information of the PCF 3, and sends the information about the PCF 3 to the AF. Assuming that the first request carries the address of the UE 3 and the PCF type 1, the first network element obtains the information about the PCF 5 from the registration information of the PCF 5, and sends the information about the PCF 5 to the AF.

In the implementation 1.2, the first PCF registers the information about the first PCF to the first network element.

The first network element receives a first registration request from the first PCF. The first registration request includes first registration information. The first registration information includes the information about the first PCF and identification information of a terminal device. The second request is used to request to register the first registration information to the first network element. Further, the first network element receives a second registration request from the second PCF. The second registration request includes second registration information. The second registration information includes information about the second PCF, the identification information of the terminal device, and an address of the terminal device. The second request is used to request to register the second registration information to the first network element. Then, the first network element establishes an association between the first registration information and the second registration information based on the identification information of the terminal device.

In other words, for the same terminal device, the first network element stores the first registration information of the first PCF and the second registration information of the second PCF that are both related to the terminal device. The first registration information and the second registration information are respectively as follows.

first registration information: the information about the first PCF, and the identification information of the terminal device; and second registration information: the information about the second PCF, the identification information of the terminal device, and the address of the terminal device.

It can be learned that the first registration information and the second registration information include same information, namely, the identification information of the terminal device. Therefore, the association between the first registration information and the second registration information may be established based on the identification information of the terminal device. That is, a correspondence between the first registration information and the second registration information is stored.

Based on the implementation 1.2, the first request in step 102 may include the address of the terminal device and a PCF type. The PCF type indicates a PCF that provides mobility management. In this case, the first network element determines the second registration information based on the address of the terminal device in the first request, and obtains the information about the first PCF from the first registration information associated with the second registration information.

In an example, the first network element stores the following information.

registration information of a PCF 1: information about the PCF 1, identification information of UE 1, and a PCF type 1;

registration information of a PCF 2: information about the PCF 2, the identification information of the UE 1, an address of the UE 1, and a PCF type 2;

registration information of a PCF 3: information about the PCF 3, identification information of UE 2, and the PCF type 1;

registration information of a PCF 4: information about the PCF 4, the identification information of the UE 2, an address of the UE 2, and the PCF type 2;

registration information of a PCF 5: information about the PCF 5, identification information of UE 3, and the PCF type 1; and registration information of a PCF 6: information about the PCF 6, the identification information of the UE 3, an address of the UE 3, and the PCF type 2.

The PCF type 1 indicates a PCF that provides mobility management, and the PCF type 2 indicates a PCF that provides session management.

Assuming that the first request carries the address of the UE 2 and the PCF type 1, the first network element determines, based on the PCF type 1, that the AF intends to obtain the information about the first PCF. In this case, the first network element determines the registration information of the PCF 4 based on the address of the UE 2, finds the registration information of the PCF 3 based on the registration information of the PCF 4, then obtains the information about the PCF 3 from the registration information of the PCF 3, and sends the information about the PCF 3 to the AF.

Implementation 2: The first network element is a UDM or a UDR, and the AMF or the first PCF registers the information about the first PCF to the first network element.

The first network element receives a registration request from the AMF or the first PCF. The registration request includes registration information. The registration information includes the information about the first PCF and identification information of a terminal device. The registration request is used to request to register the registration information to the first network element.

Based on the implementation, when the first request in step 102 carries the identification information of the terminal device, the first network element determines that the AF intends to obtain the information about the first PCF. When the first request carries an address of the terminal device, the first network element determines that the AF intends to obtain information about a second PCF. A PCF type that the AF intends to obtain may be implicitly indicated based on specific content in the information carried in the first request. Certainly, in another implementation, a PCF type may alternatively be carried in the first request, to explicitly indicate the PCF type that the AF intends to obtain.

Therefore, when the first request carries the identification information of the terminal device, the first network element obtains the information about the first PCF from the registration information corresponding to the first PCF, and sends the information about the first PCF to the AF.

In an example, the first network element stores the following information.

registration information of a PCF 1: information about the PCF 1, identification information of UE 1, and a PCF type 1;

registration information of a PCF 2: information about the PCF 2, the identification information of the UE 1, an address of the UE 1, and a PCF type 2;

registration information of a PCF 3: information about the PCF 3, identification information of UE 2, and the PCF type 1; and registration information of a PCF 4: information about the PCF 4, the identification information of the UE 2, an address of the UE 2, and the PCF type 2;

registration information of a PCF 5: information about the PCF 5, identification information of UE 3, and the PCF type 1; and registration information of a PCF 6: information about the PCF 6, the identification information of the UE 3, an address of the UE 3, and the PCF type 2.

The PCF type 1 indicates a PCF that provides mobility management, and the PCF type 2 indicates a PCF that provides session management.

Assuming that the first request carries the identification information of the UE 2, the first network element determines, based on that the first request carries the identification information of the UE 2, that the AF intends to obtain the information about the first PCF. In this case, the first network element determines the registration information of the PCF 3 based on the identification information of the UE 2, then obtains the information about the PCF 3 from the registration information of the PCF 3, and sends the information about the PCF 3 to the AF.

Implementation 3: The first network element is a second PCF, and the first PCF sends the information about the first PCF to the first network element.

For example, the second PCF receives the information about the first PCF from an SMF, and stores the information about the first PCF in the second PCF. In addition, the second PCF further stores information about the second PCF.

Based on the implementation, when the first request in step 102 carries identification information of a terminal device, the second PCF determines that the AF intends to obtain the information about the first PCF. When the first request carries an address of the terminal device, the first network element determines that the AF intends to obtain the information about the second PCF. A PCF type that the AF intends to obtain may be implicitly indicated based on specific content in the information carried in the first request. Certainly, in another implementation, a PCF type may alternatively be carried in the first request, to explicitly indicate the PCF type that the AF intends to obtain.

Therefore, when the first request carries the identification information of the terminal device, the second PCF obtains the information about the corresponding first PCF based on the identification information of the terminal device, and sends the information about the first PCF to the AF.

The following describes various implementations shown in FIG. 3 with reference to the following specific examples shown in FIG. 4 to FIG. 8.

Figure 4:
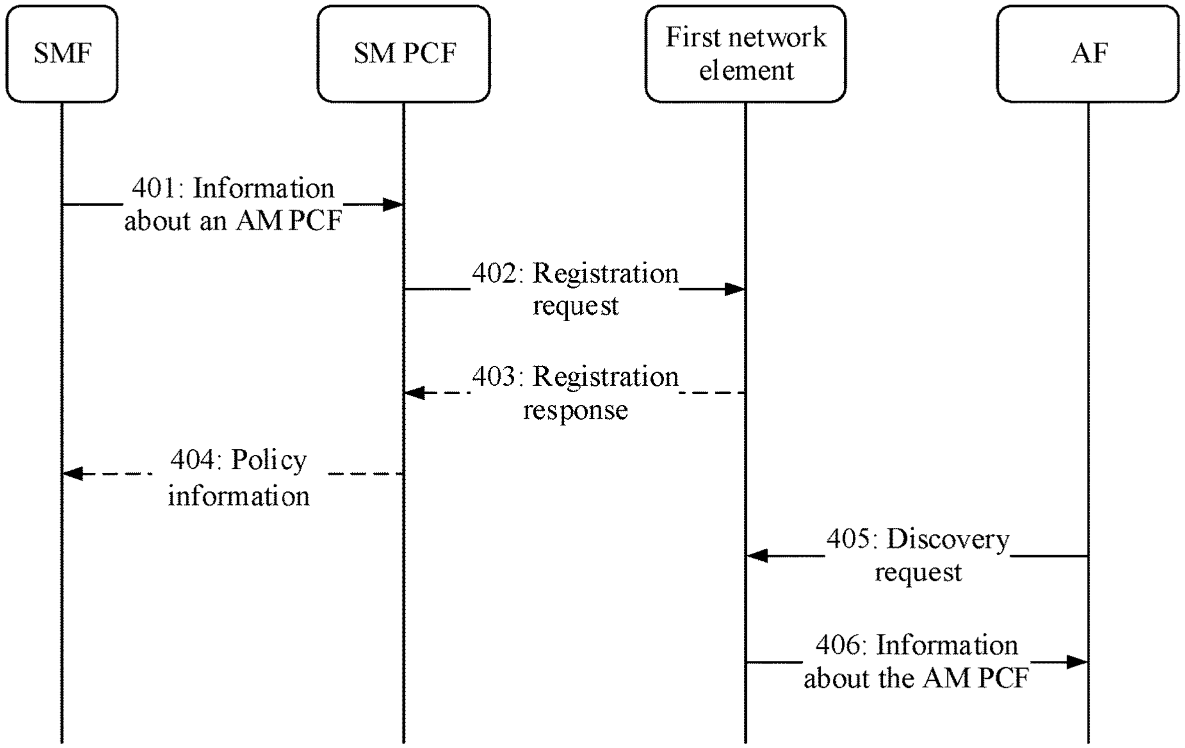
FIG. 4 is a schematic flowchart of another communication method according to an embodiment.

FIG. 4 is a schematic diagram of another communication method according to an embodiment of this application. In a conventional technology, an SM PCF may register second registration information corresponding to the SM PCF to a first network element. In the embodiment corresponding to FIG. 4, a function of registering first registration information corresponding to an AM PCF to the first network element is newly added to the SM PCF.

The method includes the following steps.

Step 401: An SMF sends information about the AM PCF to the SM PCF. Correspondingly, the SM PCF may receive the information about the AM PCF.

The SMF may obtain the information about the AM PCF from an AMF. For example, in a PDU session establishment process, the SMF obtains the information about the AM PCF from the AMF.

In a movement process of a terminal device, an AMF serving the terminal device may change, and a new AMF may select a new AM PCF. In this case, the SMF also needs to report information about the new AM PCF to the SM PCF. For example, the SM PCF may set a trigger “the AM PCF changes” on the SMF by invoking a service of the SM PCF, to trigger the SMF to report the information about the new AM PCF to the SM PCF after the SMF obtains the information about the new AM PCF. For another example, the SM PCF may subscribe to a notification “the AM PCF changes” from the SMF by invoking a service of the SMF, to trigger the SMF to report the information about the new AM PCF to the SM PCF after the SMF obtains the information about the new AM PCF.

In an example, the SMF may send the information about the AM PCF to the SM PCF by invoking a service Npcf_SMPolicyControl_Create.

Step 402: The SM PCF sends a registration request to the first network element. Correspondingly, the first network element may receive the registration request.

The first network element herein includes but is not limited to a BSF network element, a UDR, or a UDM.

The registration request is used to register registration information (which is referred to as the first registration information below) corresponding to the AM PCF to the first network element.

The SM PCF may also register registration information (which is referred to as the second registration information below) corresponding to the SM PCF to the first network element. Therefore, when registering the first registration information corresponding to the AM PCF or the second registration information corresponding to the SM PCF to the first network element, the SM PCF needs to distinguish between registered PCF types (PCF type). In an example, the following provides three different implementations.

Method 1: Add a PCF type during registration.

For example, it is predefined that the PCF type includes the AM PCF and the SM PCF, or the PCF type includes a first type and a second type. The first type indicates the AM PCF, and the second type indicates the SM PCF.

The first registration information in the registration request in step 402 includes one or more of the following information: identification information (for example, a subscription permanent identifier (SUPI)) of the terminal device, an address (for example, an IPv4 address, an IPv6 prefix, or a MAC address) of the terminal device, the information about the AM PCF, the PCF type, a DNN, and S-NSSAI. The address of the terminal device, the information about the AM PCF, and the PCF type are mandatory, and the other information is optional. The PCF type indicates the AM PCF.

Method 2: Invoke services of different types during registration.

When registering the first registration information and the second registration information to the first network element, the SM PCF uses services of different types for distinction.

For example, when registering the first registration information corresponding to the AM PCF to the first network element, the SM PCF invokes a first-type service. In other words, the registration request in step 402 is a first-type registration request. When registering the second registration information corresponding to the SM PCF to the first network element, the SM PCF invokes a second-type service. Therefore, the first network element determines, by identifying an invoked service type, whether the first registration information corresponding to the AM PCF or the second registration information corresponding to the SM PCF is registered.

Method 3: Add additional indication information during registration.

When registering the second registration information corresponding to the SM PCF to the first network element, the SM PCF does not add indication information. For example, when the SM PCF registers the second registration information corresponding to the SM PCF to the first network element, the second registration information includes one or more of the following information: identification information of the terminal device, an address of the terminal device, the information about the SM PCF, a DNN, and S-NSSAI. The address of the terminal device and the information about the SM PCF are mandatory, and the other information is optional.

When registering the first registration information corresponding to the AM PCF to the first network element, the SM PCF adds indication information. For example, when the SM PCF registers the first registration information corresponding to the AM PCF to the first network element, the first registration information includes one or more of the following information: the identification information of the terminal device, the address of the terminal device, the information about the AM PCF, the indication information, the DNN, and the S-NSSAI. The address of the terminal device, the information about the AM PCF, and the indication information are mandatory, and the other information is optional. The indication information indicates that the first registration information corresponding to the AM PCF is registered.

According to any one of the method 1 to the method 3, the first network element may identify a type of the registration information, and may store the first registration information and/or the second registration information.

The first registration information includes one or more of the following: the identification information of the terminal device, the address of the terminal device, the information about the PCF, the DNN, and the S-NSSAI. The address of the terminal device and the information about the AM PCF are mandatory, and the identification information of the terminal device, the DNN, and the S-NSSAI are optional. In addition, the first network element further needs to identify that the first registration information is registration information corresponding to the AM PCF. For example, the PCF type may be added to the first registration information, to indicate that the first registration information is registration information corresponding to the AM PCF. For another example, an index of the first registration information may alternatively be added to the first network element. The index indicates that the first registration information is registration information corresponding to the AM PCF.

The second registration information includes one or more of the following: the identification information of the terminal device, the address of the terminal device, the information about the PCF, the DNN, and the S-NSSAI. The address of the terminal device and the information about the SM PCF are mandatory, and the identification information of the terminal device, the DNN, and the S-NSSAI are optional. In addition, the first network element further needs to identify that the second registration information is registration information corresponding to the SM PCF. For example, the PCF type may be added to the second registration information, to indicate that the second registration information is registration information corresponding to the SM PCF. For another example, an index of the second registration information may alternatively be added to the first network element. The index indicates that the second registration information is registration information corresponding to the SM PCF.

Step 403: The first network element sends a registration response to the SM PCF. Correspondingly, the SM PCF may receive the registration response.

This step is optional.

Step 404: The SM PCF makes a policy decision, and delivers policy information to the SMF.

This step is optional.

Step 405: The AF sends a discovery request to the first network element. Correspondingly, the first network element may receive the discovery request.

The discovery request carries the address of the terminal device, and is used to request the information about the AM PCF corresponding to the address of the terminal device. The first network element stores the first registration information corresponding to the AM PCF and the second registration information corresponding to the SM PCF, and both the first registration information and the second registration information include the identification information of the same terminal device. Therefore, to enable the first network element to determine that the information about the AM PCF instead of the information about the SM PCF needs to be sent to the AF, any one of the following methods may be used to implementation.

Method 1: The discovery request in step 405 further carries the PCF type, and the type indicates the AM PCF.

To be specific, the discovery request includes the address of the terminal device and the PCF type, and is used to request the information about the AM PCF corresponding to the address of the terminal device. For example, the PCF type indicates the AM PCF.

Method 2: Invoke services of different types when requesting to obtain the information about the PCF.

When requesting the first network element for obtaining the information about the SM PCF and the information about the AM PCF, the AF uses services of different types for distinction. For example, the AF invokes a first-type service when requesting the first network element for obtaining the information about the AM PCF, and invokes a second-type service when requesting the first network element for obtaining the information about the SM PCF, so that the first network element determines, by identifying an invoked service type, whether the requested PCF is the AM PCF or the SM PCF.

Based on this method, the discovery request in step 405 corresponds to the first-type service.

Method 3: Add addition indication information when requesting to obtain the information about the PCF.

When requesting the first network element for obtaining the information about the SM PCF, the AF does not add indication information. To be specific, when requesting the first network element for obtaining the information about the SM PCF, the AF includes the address of the terminal device in the discovery request.

When requesting the first network element for obtaining the information about the AM PCF, the AF adds the indication information. To be specific, when requesting the first network element for obtaining the information about the SM PCF, the AF includes the address of the terminal device and the indication information in the discovery request. The indication information indicates that the information about the AM PCF is requested to be obtained.

Based on this method, the discovery request in step 405 includes the address of the terminal device and the indication information.

Method 4: Add exclusive information when requesting to obtain the information about the PCF, where the exclusive information is information available only when the AF sends a requirement related to an AM policy.

Based on this method, the discovery request carries the exclusive information, for example, a preferred use frequency, information about a use location, so that the first network element may obtain, based on the exclusive information and the address of the terminal device, the information about the AM PCF corresponding to the address of the terminal device and the exclusive information.

Step 406: The first network element sends the information about the AM PCF to the AF. Correspondingly, the AF may receive the information about the AM PCF.

When determining that the AF requests the information about the AM PCF, the first network element obtains, from the first network element, the first registration information that includes the address of the terminal device in the discovery request, then obtains the information about the AM PCF from the first registration information, and sends the information about the AM PCF to the AF.

Based on the foregoing solution, the SM PCF may register the first registration information corresponding to the AM PCF to the first network element, so that the AF may subsequently request the first network element for obtaining the information about the AM PCF. The AF may further send input information to the AM PCF, so that the AM PCF can select, based on the input information, an AM policy that matches a requirement of a currently running application. This helps improve precision of the AM policy.

In an alternative implementation, step 405 and step 406 are replaced with the following step 405' to step 408'.

Step 405': The AF sends a first discovery request to the SM PCF. Correspondingly, the SM PCF may receive the first discovery request.

A specific implementation of the first discovery request is similar to that of the discovery request in step 405, and details are not described again.

Step 406': The SM PCF sends a second discovery request to the first network element. Correspondingly, the first network element may receive the second discovery request.

The second discovery request is used to request to obtain the information about the AM PCF, and the second discovery request includes the address of the terminal device.

Step 407': The first network element sends the information about the AM PCF to the SM PCF. Correspondingly, the SM PCF may receive the information about the AM PCF.

Step 408': The SM PCF sends the information about the AM PCF to the AF. Correspondingly, the AF may receive the information about the AM PCF.

Figure 5:
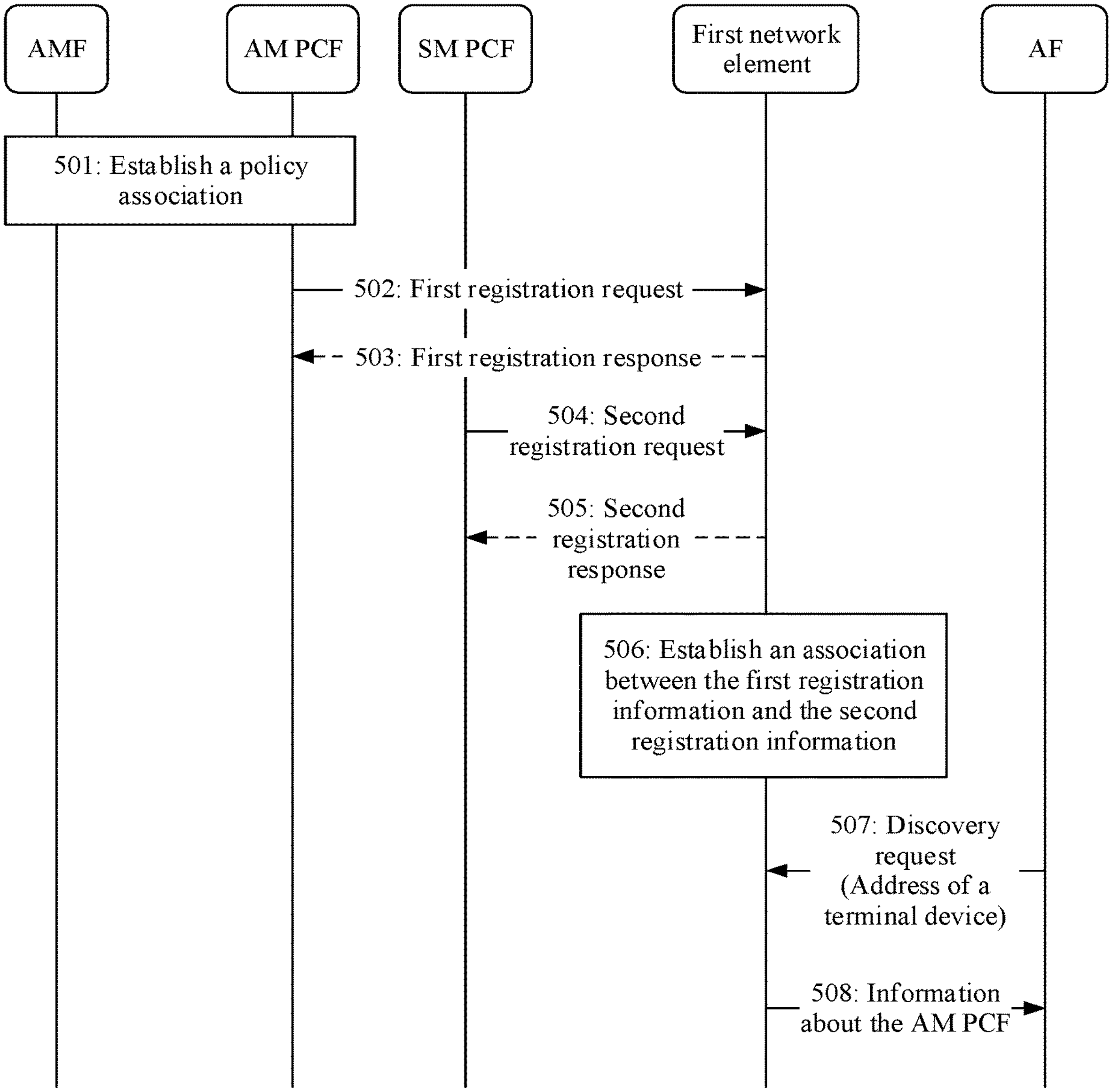
FIG. 5 is a schematic flowchart of another communication method according to an embodiment.

FIG. 5 is a schematic diagram of another communication method according to an embodiment of this application. In a conventional technology, an SM PCF may register second registration information corresponding to the SM PCF to a first network element. In the embodiment corresponding to FIG. 5, an AM PCF may register first registration information corresponding to the AM PCF to the first network element, and then establish, in the first network element, an association between the first registration information and the second registration information.

The method includes the following steps.

Step 501: After a terminal device is registered, establish a policy association between an AMF and the AM PCF.

In an example, the AMF may send a request Npcf_AM-PolicyControl_Create to the AM PCF, to request to establish the policy association between the AMF and the AM PCF.

Step 502: The AM PCF sends a first registration request to the first network element. Correspondingly, the first network element may receive the first registration request.

The first network element herein includes but is not limited to a BSF network element, a UDR, or a UDM.

The registration request is used to request to register registration information (which is referred to as the first registration information below) corresponding to the AM PCF to the first network element. The first registration information includes identification information (for example, an SUPI) of the terminal device and information about the AM PCF.

Step 503: The first network element sends a first registration response to the AM PCF. Correspondingly, the AM PCF may receive the first registration response.

This step is optional.

Step 504: The SM PCF sends a second registration request to the first network element. Correspondingly, the first network element may receive the second registration request.

After establishing a PDU session, the SM PCF may register registration information (which is referred to as the second registration information below) corresponding to the SM PCF to the first network element. The second registration information includes one or more of the following information: the identification information (for example, the SUPI) of the terminal device, an address (for example, an IPv4 address, an IPv6 prefix, or a MAC address) of the terminal device, information about the SM PCF, a DNN, and S-NSSAI. The address of the terminal device, the identification information of the terminal device, and the information about the SM PCF are mandatory, and the other information is optional.

Step 505: The first network element sends a second registration response to the SM PCF. Correspondingly, the SM PCF may receive the second registration response.

This step is optional.

Step 506: The first network element establishes the association between the first registration information and the second registration information based on the identification information of the terminal device.

For the same terminal device, the first registration information and the second registration information include the identification information of the same terminal device. Therefore, the association between the first registration information and the second registration information may be established by using the identification information of the terminal device in the first registration information and the identification information of the terminal device in the second registration information. "Establish" herein may be understood as saving, storing, or the like.

It should be noted that, before establishing the association between the first registration information and the second registration information, the first network element needs to identify that the first registration information is the registration information corresponding to the AM PCF, and that the second registration information is the registration information corresponding to the SM PCF. The following provides four different implementations, so that the first network element can identify PCF types respectively corresponding to the first registration information and the second registration information.

Method 1: Identify the first registration information and the second registration information by using content carried in the registration request.

The first network element may receive the first registration request from the AM PCF, and receive the second registration request from the SM PCF. When the registration request carries the identification information of the terminal device and the information about the PCF, the first network element determines that the registration request is from the AM PCF. When the registration request carries at least the address of the terminal device, the identification information of the terminal device, and the information about the PCF, the first network element determines that the registration request is from the SM PCF.

Alternatively, provided that the registration request received by the first network element carries the address of the terminal device, the first network element determines that the registration request is from the SM PCF. Otherwise, the first network element determines that the registration request is from the AM PCF.

Method 2: Add the PCF type during registration.

For example, it is predefined that the PCF type includes the AM PCF and the SM PCF, or the PCF type includes a first type and a second type. The first type indicates the AM PCF, and the second type indicates the SM PCF.

Based on this method, the first registration information in the first registration request in step 502 further includes a PCF type, and the PCF type indicates the AM PCF. The second registration information in the second registration request in step 504 further includes a PCF type, and the PCF type indicates the SM PCF.

Method 3: Invoke services of different types during registration.

For example, when sending the first registration request to the first network element, the AM PCF invokes a first-type service, that is, the first registration request in step 502 is a first-type registration request. When sending the second registration request to the first network element, the SM PCF invokes a second-type service, that is, the second registration request in step 504 is a second-type registration request. Therefore, the first network element determines, based on an invoked service type, that the first registration request corresponds to the AM PCF and the second registration request corresponds to the SM PCF.

Method 4: Add additional indication information during registration.

For example, the indication information may be added to the first registration information in the first registration request in step 502. To be specific, the first registration information includes the identification information of the terminal device, the information about the AM PCF, and the indication information. The indication information indicates that the first registration information is the registration information corresponding to the AM PCF.

According to any one of the foregoing methods, the first network element may identify the first registration information and the second registration information.

The first registration information includes the identification information of the terminal device and the information about the PCF. In addition, the first network element further needs to identify that the first registration information is registration information corresponding to the AM PCF. For example, the PCF type may be added to the first registration information, to indicate that the first registration information is registration information corresponding to the AM PCF. For another example, an index of the first registration information may alternatively be added to the first network element. The index indicates that the first registration information is registration information corresponding to the AM PCF.

The second registration information includes one or more of the following: the identification information of the terminal device, the address of the terminal device, the information about the PCF, the PCF type, the DNN, and the S-NSSAI. The address of the terminal device, the identification information of the terminal device, and the information about the SM PCF are mandatory, and the DNN and the S-NSSAI are optional. In addition, the first network element further needs to identify that the second registration information is registration information corresponding to the SM PCF. For example, the PCF type may be added to the second registration information, to indicate that the second registration information is registration information corresponding to the SM PCF. For another example, an index of the second registration information may alternatively be added to the first network element. The index indicates that the second registration information is registration information corresponding to the SM PCF.

Based on step 506, on one hand, the first network element identifies that the first registration information is associated with the AM PCF and the second registration information is associated with the SM PCF, and on the other hand, the first network element further establishes the association between the first registration information and the second registration information.

Step 507: The AF sends a discovery request to the first network element. Correspondingly, the first network element may receive the discovery request.

A specific implementation of step 507 is the same as that of step 405 in the embodiment corresponding to FIG. 4. Refer to the foregoing descriptions, and details are not described again.

Step 508: The first network element sends the information about the AM PCF to the AF. Correspondingly, the AF may receive the information about the AM PCF.

When determining that the AF requests the information about the AM PCF, the first network element obtains, from the first network element, the second registration information that includes the address of the terminal device in the discovery request, then obtains the first registration information associated with the second registration information, obtains the information about the AM PCF from the first registration information, and sends the information about the AM PCF to the AF.

Based on the foregoing solution, the AM PCF registers, to the first network element, the first registration information corresponding to the AM PCF, the SM PCF registers, to the first network element, the second registration information corresponding to the SM PCF, and then the first network element establishes the association between the first registration information and the second registration information. When the AF subsequently requests the first network element for obtaining the information about the AM PCF, the first network element first finds the second registration information based on a request from the AF, then finds the first registration information, and sends, to the AF, the information about the AM PCF in the first registration information. The AF may further send input information to the AM PCF, so that the AM PCF can select, based on the input information, an AM policy that matches a requirement of a currently running application. This helps improve precision of the AM policy.

In an alternative implementation, step 507 and step 508 are replaced with the following step 507' to step 510'.

Step 507': The AF sends a first discovery request to the SM PCF. Correspondingly, the SM PCF may receive the first discovery request.

A specific implementation of the first discovery request is similar to that of the discovery request in step 507, and details are not described again.

Step 508': The SM PCF sends a second discovery request to the first network element. Correspondingly, the first network element may receive the second discovery request.

The second discovery request is used to request to obtain the information about the AM PCF, and the second discovery request includes the address of the terminal device.

Step 509': The first network element sends the information about the AM PCF to the SM PCF. Correspondingly, the SM PCF may receive the information about the AM PCF.

When determining that the SM PCF requests the information about the AM PCF, the first network element obtains, from the first network element, the second registration information that includes the address of the terminal device in the discovery request, then obtains the first registration information associated with the second registration information, obtains the information about the AM PCF from the first registration information, and sends the information about the AM PCF to the SM PCF.

Step 510': The SM PCF sends the information about the AM PCF to the AF. Correspondingly, the AF may receive the information about the AM PCF.

Figure 6:
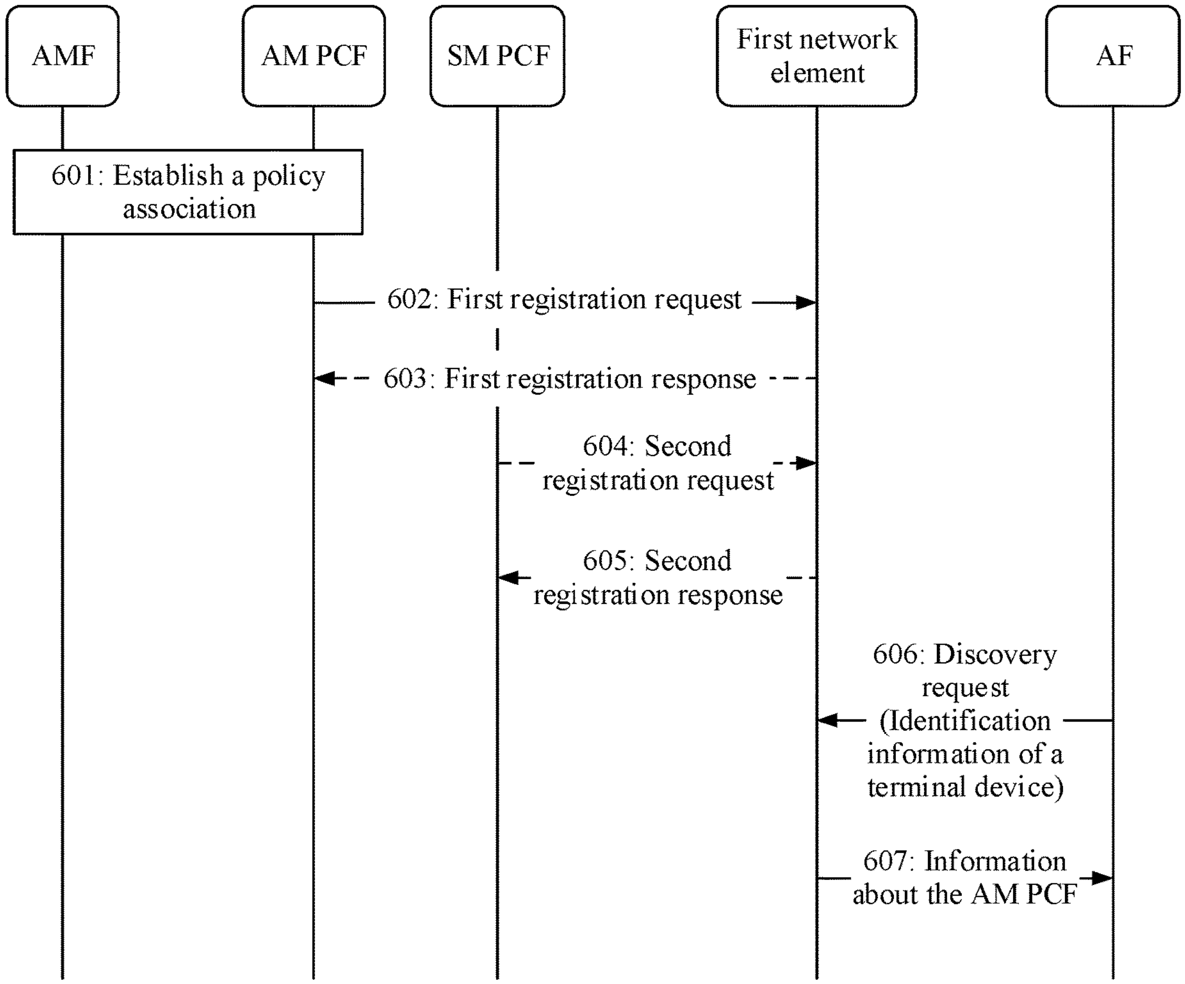
FIG. 6 is a schematic flowchart of another communication method according to an embodiment.

FIG. 6 is a schematic diagram of another communication method according to an embodiment of this disclosure. In a conventional technology, an SM PCF may register registration information (which is referred to as second registration information below) corresponding to the SM PCF to a first network element. In the embodiment corresponding to FIG. 6, an AM PCF may register registration information (which is referred to as first registration information below) corresponding to the AM PCF to the first network element. Then an AF may include, in a discovery request, identification information of a terminal device, to implicitly indicate that information about the AM PCF corresponding to the identification information of the terminal device is requested to be obtained.

The method includes the following steps.

Step 601 to step 605 are the same as step 501 to step 505 in the embodiment corresponding to FIG. 5. For details, refer to the foregoing descriptions.

Step 603 to step 605 are all optional steps. In addition, when step 604 is not performed, step 605 is not performed either.

Step 606: The AF sends a discovery request to the first network element. Correspondingly, the first network element may receive the discovery request.

When the discovery request carries the identification information of the terminal device, the discovery request is used to request to obtain the information about the AM PCF corresponding to the identification information of the terminal device. When the discovery request carries the address of the terminal device, the discovery request is used to request to obtain the information about the SM PCF corresponding to the address of the terminal device. Therefore, content carried in the discovery request may be used to implicitly indicate the PCF type requested to be obtained.

In this embodiment of this application, because the AF intends to obtain the information about the AM PCF, the discovery request in step 606 carries the identification information of the terminal device.

Step 607: The first network element sends the information about the AM PCF to the AF. Correspondingly, the AF may receive the information about the AM PCF.

When determining, based on the identification information of the terminal device carried in the discovery request, that the AF requests the information about the AM PCF, the first network element obtains, from the first network element, the first registration information that includes the identification information of the terminal device in the discovery request, obtains the information about the AM PCF from the first registration information, and then sends the information about the AM PCF to the AF.

Based on the foregoing solution, the AM PCF registers the first registration information corresponding to the AM PCF to the first network element. When the AF subsequently requests the first network element for obtaining the information about the AM PCF, the first network element identifies, based on a request from the AF, that the AF intends to obtain the information about the AM PCF, finds the first registration information based on the identification information of the terminal device in the discovery request, and sends, to the AF, the information about the AM PCF in the first registration information. The AF may further send input information to the AM PCF, so that the AM PCF can select, based on the input information, an AM policy that matches a requirement of a currently running application. This helps improve precision of the AM policy.

In an alternative implementation, step 606 and step 607 are replaced with the following step 606' to step 609'.

Step 606': The AF sends a first discovery request to the SM PCF. Correspondingly, the SM PCF may receive the first discovery request.

A specific implementation of the first discovery request is similar to that of the discovery request in step 606, and details are not described again.

Step 607': The SM PCF sends a second discovery request to the first network element. Correspondingly, the first network element may receive the second discovery request.

The second discovery request is used to request to obtain the information about the AM PCF, and the second discovery request includes the identification information of the terminal device.

Step 608': The first network element sends the information about the AM PCF to the SM PCF. Correspondingly, the SM PCF may receive the information about the AM PCF.

When determining, based on the identification information of the terminal device carried in the second discovery request, that the SM PCF requests the information about the AM PCF, the first network element obtains, from the first network element, the first registration information that includes the identification information of the terminal device in the discovery request, obtains the information about the AM PCF from the first registration information, and then sends the information about the AM PCF to the SM PCF.

Step 609': The SM PCF sends the information about the AM PCF to the AF. Correspondingly, the AF may receive the information about the AM PCF.

Figure 7:
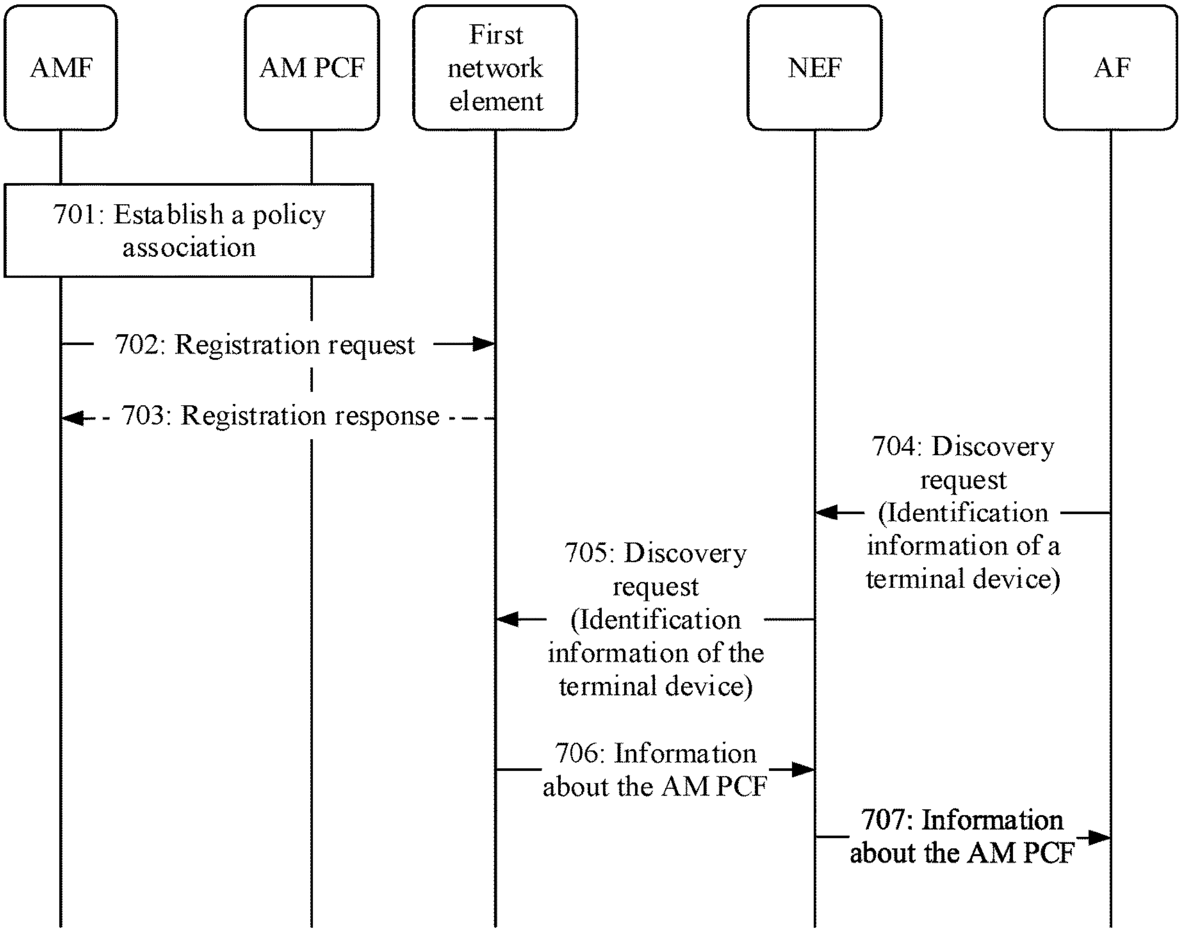
FIG. 7 is a schematic flowchart of another communication method according to an embodiment.

FIG. 7 is a schematic diagram of another communication method according to an embodiment of this disclosure. In this embodiment, an AMF registers registration information corresponding to an AM PCF to a UDM or a UDR, and subsequently an AF may discover information about the AM PCF from the UDM or the UDR by using an NEF.

The method includes the following steps.

Step 701: After a terminal device is registered, establish a policy association between the AMF and the AM PCF.

In an example, the AMF may send a request Npcf_AMPolicyControl_Create to the AM PCF, to request to establish the policy association between the AMF and the AM PCF.

Step 702: The AMF sends a registration request to a first network element. Correspondingly, the first network element may receive the registration request.

The first network element herein includes but is not limited to a UDR or a UDM.

The registration request is used to request to register the registration information corresponding to the AM PCF to the first network element. The registration information includes identification information (for example, an SUPI) of the terminal device and the information about the AM PCF.

In a movement process of the terminal device, the AMF serving the terminal device may change, and a new AMF may select a new AM PCF. In this case, the AMF also needs to register information about the new AM PCF to the first network element.

For example, when the first network element is a UDM, the AMF may directly register the registration information to the UDM.

When the first network element is a UDR, the AMF may directly register the registration information to the UDM, and then the UDM stores the registration information in the UDR. Alternatively, the AMF may store the registration information in the UDR by using the NEF.

Step 703: The first network element sends a registration response to the AMF. Correspondingly, the AMF may receive the registration response.

This step is optional.

Step 704: The AF sends a discovery request to the NEF. Correspondingly, the NEF may receive the discovery request.

When the discovery request carries the identification information of the terminal device, the discovery request is used to request to obtain the information about the AM PCF corresponding to the identification information of the terminal device. When the discovery request carries the address of the terminal device, the discovery request is used to request to obtain the information about the SM PCF corresponding to the address of the terminal device. Therefore, content carried in the discovery request may be used to implicitly indicate the PCF type requested to be obtained.

In this embodiment of this application, because the AF intends to obtain the information about the AM PCF, the discovery request in step 704 carries the identification information of the terminal device.

Step 705: The NEF sends a discovery request to the first network element. Correspondingly, the first network element may receive the discovery request.

The discovery request carries the identification information of the terminal device, and is used to request to obtain the information about the AM PCF corresponding to the identification information of the terminal device.

Step 706: The first network element sends the information about the AM PCF to the NEF. Correspondingly, the NEF may receive the information about the AM PCF.

When determining, based on the identification information of the terminal device carried in the discovery request, that the information about the AM PCF is requested, the first network element obtains, from the first network element, the first registration information that includes the identification information of the terminal device in the discovery request, obtains the information about the AM PCF from the registration information, and then sends the information about the AM PCF to the AF.

Step 707: The NEF sends the information about the AM PCF to the AF. Correspondingly, the AF may receive the information about the AM PCF.

Based on the foregoing solution, the AMF registers the registration information corresponding to the AM PCF to the first network element. When the AF subsequently requests, by using the NEF, the first network element for obtaining the information about the AM PCF, the first network element identifies, based on a request from the AF, that the AF intends to obtain the information about the AM PCF, finds the registration information based on the identification information of the terminal device in the discovery request, and sends, to the AF, the information about the AM PCF in the registration information. The AF may further send input information to the AM PCF, so that the AM PCF can select, based on the input information, an AM policy that matches a requirement of a currently running application. This helps improve precision of the AM policy.

Figure 8:
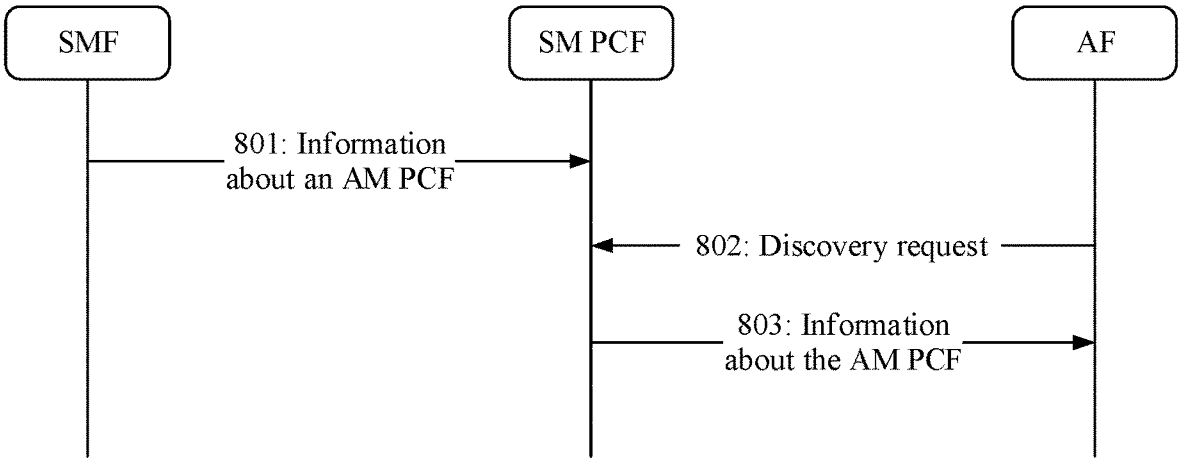
FIG. 8 is a schematic flowchart of another communication method according to an embodiment.

FIG. 8 is a schematic diagram of another communication method according to an embodiment of this disclosure. In this embodiment, an SMF sends information about an AM PCF to an SM PCF, so that an AF can subsequently obtain the information about the AM PCF from the SM PCF.

The method includes the following steps.

Step 801: The SMF sends the information about the AM PCF to the SM PCF. Correspondingly, the SM PCF may receive the information about the AM PCF.

Step 801 is the same as step 401 in the embodiment corresponding to FIG. 4. Refer to the foregoing descriptions.

Step 802: The AF sends a discovery request to the SM PCF. Correspondingly, the SM PCF may receive the discovery request.

When the discovery request carries identification information of a terminal device, the discovery request is used to request to obtain the information about the AM PCF corresponding to the identification information of the terminal device. When the discovery request carries an address of the terminal device, the discovery request is used to request to obtain the information about the SM PCF corresponding to the address of the terminal device. Therefore, content carried in the discovery request may be used to implicitly indicate the PCF type requested to be obtained.

In this embodiment, because the AF intends to obtain the information about the AM PCF, the discovery request in step 802 carries the identification information of the terminal device.

Step 803: The SM PCF sends the information about the AM PCF to the AF. Correspondingly, the AF may receive the information about the AM PCF.

When determining, based on the identification information of the terminal device carried in the discovery request, that the AF requests the information about the AM PCF, the SM PCF obtains, from the first network element, the registration information that includes the identification information of the terminal device in the discovery request, obtains the information about the PCF, namely, the information about the AM PCF, from the registration information, and then sends the information about the AM PCF to the AF.

Based on the foregoing solution, the SMF sends the information about the AM PCF to the SM PCF. When the AF subsequently requests the SM PCF for obtaining the information about the AM PCF, the SM PCF identifies, based on a request from the AF, that the AF intends to obtain the information about the AM PCF, finds the registration information based on the identification information of the terminal device in the discovery request, and sends, to the AF, the information about the AM PCF in the registration information. The AF may further send input information to the AM PCF, so that the AM PCF can select, based on the input information, an AM policy that matches a requirement of a currently running application. This helps improve precision of the AM policy.

In the foregoing embodiments corresponding to FIG. 4 to FIG. 8, the AF may obtain the information about the AM PCF by using different methods. Therefore, the AF may further send input information to the AM PCF, so that the AM PCF can select, based on the input information, an AM policy that matches a requirement of a currently running application. This helps improve precision of the AM policy.

In another implementation, alternatively, the AF may not need to know the information about the AM PCF, but forwards, by using another network element, input information required by the AM PCF to the AM PCF. Therefore, the AM PCF may select, based on the input information, an AM policy that matches a requirement of a currently running application. The following provides two examples of the implementation, which are respectively shown in FIG. 9 and FIG. 10.

Figure 9:
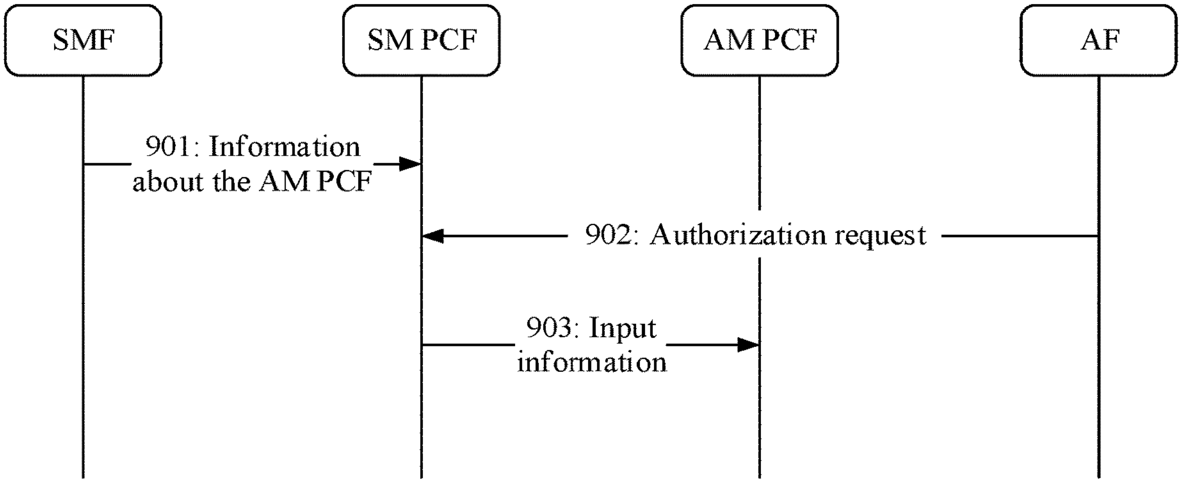
FIG. 9 is a schematic flowchart of another communication method according to an embodiment.

FIG. 9 is a schematic diagram of another communication method according to an embodiment of this disclosure. In this embodiment, an SMF sends information about an AM PCF to an SM PCF, so that an AF can subsequently send input information to the SM PCF, and the SM PCF forwards the input information to the AM PCF.

The method includes the following steps.

Step 901: The SMF sends the information about the AM PCF to the SM PCF. Correspondingly, the SM PCF may receive the information about the AM PCF.

Step 901 is the same as step 401 in the embodiment corresponding to FIG. 4. Refer to the foregoing descriptions.

Step 902: The AF sends an authorization request to the SM PCF. Correspondingly, the SM PCF may receive the authorization request.

The authorization request includes the input information, and the input information may be, for example, an access frequency or an access position preferred by a current application.

Step 903: The SM PCF sends the input information to the AM PCF. Correspondingly, the AM PCF may receive the input information.

Based on the foregoing solution, the SMF sends the information about the AM PCF to the SM PCF. The AF may subsequently send the input information to the AM PCF by using the SM PCF, so that the AM PCF can select, based on the input information, an AM policy that matches a requirement of a currently running application. This helps improve precision of the AM policy.

Figure 10:
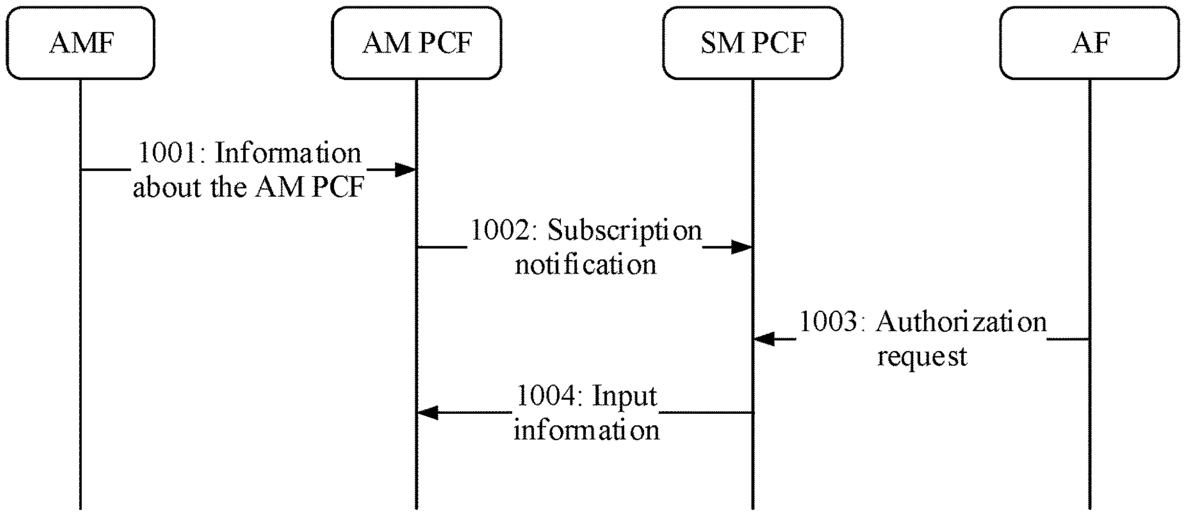
FIG. 10 is a schematic flowchart of another communication method according to an embodiment.

FIG. 10 is a schematic diagram of another communication method according to an embodiment of this disclosure. In this embodiment, an AMF sends information about an SM PCF to an AM PCF, and then the AM PCF sends a subscription notification to the SM PCF, to subscribe to input information received by the SM PCF, so that the AM PCF can obtain the input information from the AF.

The method includes the following steps.

Step 1001: The AMF sends the information about the SM PCF to the AM PCF. Correspondingly, the AM PCF may receive the information about the SM PCF.

The AMF may obtain the information about the SM PCF from an SMF in the PDU session establishment process, and then send the information about the SM PCF to the AM PCF.

Step 1002: The AM PCF sends the subscription notification to the SM PCF, where the subscription notification is used to subscribe that the SM PCF sends the input information to the AM PCF when receiving the input information from the AF.

The input information may be, for example, an access frequency or an access position preferred by a current application.

Step 1003: The AF sends an authorization request to the SM PCF. Correspondingly, the SM PCF may receive the authorization request.

The authorization request includes the input information, and the input information may be, for example, an access frequency or an access position preferred by a current application.

Step 1004: The SM PCF sends the input information to the AM PCF. Correspondingly, the AM PCF may receive the input information.

Based on the foregoing solution, the AMF sends the information about the SM PCF to the AM PCF, so that the AM PCF may subscribe, from the SM PCF, to the input information from the AF. The AF may subsequently send the input information to the AM PCF by using the SM PCF, so that the AM PCF can select, based on the input information, an AM policy that matches a requirement of a currently running application. This helps improve precision of the AM policy.

The foregoing mainly describes the solutions provided in this disclosure from a perspective of interaction between network elements. It may be understood that, to implement the foregoing functions, each network element includes a corresponding hardware structure and/or software module for implementing each function. A person of ordinary skill in the art should easily be aware that, in combination with the examples described in embodiments of this disclosure, units, algorithms and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

It may be understood that, in the foregoing method embodiments, corresponding steps and operations implemented by the first network device may alternatively be implemented by a component (for example, a chip or a circuit) disposed in the first network device, and the steps and the operations implemented by the application function network element may alternatively be implemented by a component (for example, a chip or a circuit) disposed in the application function network element.

Figure 11:
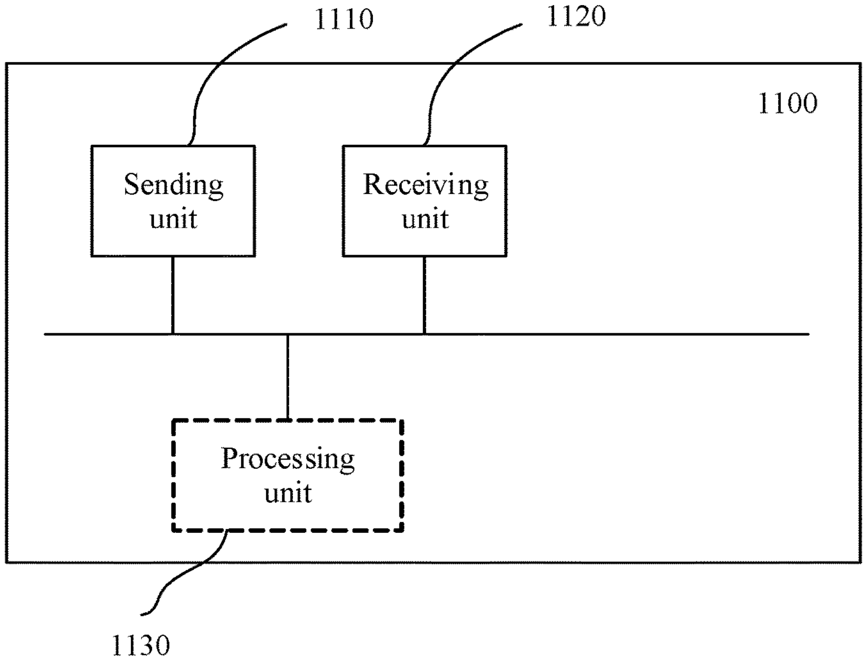
FIG. 11 is a schematic diagram of a communication apparatus according to an embodiment.

FIG. 11 is a schematic diagram of a communication apparatus according to an embodiment of this disclosure. The apparatus is configured to implement the steps performed by the corresponding first network element in the foregoing method embodiments. As shown in FIG. 11, the apparatus 1100 includes a sending unit 1110 and a receiving unit 1120. Optionally, the apparatus 1100 further includes a processing unit 1130.

The receiving unit 1120 is configured to receive, from an application function network element, a first request for requesting to obtain information about a first policy control network element, where the first policy control network element is a policy control network element that provides mobility management. The sending unit 1110 is configured to send the information about the first policy control network element to the application function network element.

In a possible implementation, the receiving unit 1120 is further configured to receive a first registration request from the first policy control network element, where the first registration request includes first registration information, the first registration information includes the information about the first policy control network element and identification information of a terminal device, and the second request is used to request to register the first registration information to the first network element; and receive a second registration request from a second policy control network element, where the second registration request includes second registration information, the second registration information includes information about the second policy control network element, the identification information of the terminal device, and an address of the terminal device, the second request is used to request to register the second registration information to the first network element, and the second policy control network element is a policy control network element that provides session management. The processing unit 1130 is configured to establish an association between the first registration information and the second registration information based on the identification information of the terminal device.

In a possible implementation, the first request includes the address of the terminal device and a policy-control-network-element type, and the policy-control-network-element type indicates a policy control network element that provides mobility management. The processing unit 1130 is further configured to: determine the second registration information based on the address of the terminal device; and obtain the information about the first policy control network element from the first registration information associated with the second registration information.

In a possible implementation, the receiving unit 1120 is further configured to receive a third registration request from a second policy control network element. The third registration request includes third registration information. The third registration information includes the information about the first policy control network element and an address of a terminal device. The third registration request is used to request to register the third registration information to the first network element. The second policy control network element is a policy control network element that provides session management.

In a possible implementation, the first request includes the address of the terminal device and a policy-control-network-element type, and the policy-control-network-element type indicates a policy control network element that provides mobility management. The processing unit 1130 is configured to obtain the information about the first policy control network element from the third registration information corresponding to the address of the terminal device and the policy-control-network-element type.

In a possible implementation, the receiving unit 1120 is further configured to receive a fourth registration request from a mobility management network element or the first policy control network element. The fourth registration request includes fourth registration information. The fourth registration information includes the information about the first policy control network element and identification information of a terminal device. The fourth registration request is used to request to register the fourth registration information to the first network element.

In a possible implementation, the first request includes the identification information of the terminal device. The processing unit 1130 is configured to obtain the information about the first policy control network element from the fourth registration information corresponding to the identification information of the terminal device.

In a possible implementation, the communication apparatus is a binding support function network element, a unified data management network element, or a unified data repository.

In a possible implementation, the communication apparatus is a second policy control network element, and the second policy control network element is a policy control network element that provides session management. The receiving unit 1120 is further configured to receive the information about the first policy control network element from a session management network element.

Optionally, the communication apparatus 1100 may further include a storage unit. The storage unit is configured to store data or instructions (which may also be referred to as code or a program). The foregoing units may interact with or be coupled to the storage unit, to implement a corresponding method or function. For example, the processing unit may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the unit in any one of the foregoing apparatuses may be one or more integrated circuits configured to implement the foregoing methods, for example, one or more application-specific integrated circuits (ASICs), one or more microprocessors (DSPs), one or more field programmable gate arrays (FPGAs), or a combination of at least two of the integrated circuit forms. For another example, when the unit in the apparatus may be implemented in a form in which a processing element invokes a program, the processing element may be a general-purpose processor, for example, a central processing unit (CPU) or another processor that can invoke the program. For another example, the units may be integrated and implemented in a form of a system-on-a-chip (SoC).

The receiving unit 1120 is an interface circuit of the apparatus, and is configured to receive a signal from another apparatus. For example, when the apparatus is implemented by a chip, the receiving unit 1120 is an interface circuit that is of the chip and that is configured to receive a signal from another chip or apparatus. The sending unit 1110 is an interface circuit of the apparatus, and is configured to send a signal to another apparatus. For example, when the apparatus is implemented by a chip, the sending unit 1110 is an interface circuit that is of the chip and that is configured to send a signal to another chip or apparatus.

Figure 12:
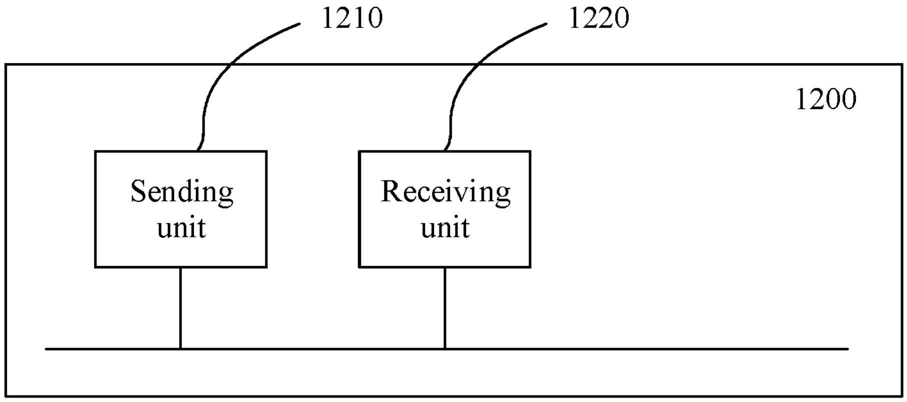
FIG. 12 is a schematic diagram of another communication apparatus according to an embodiment.

FIG. 12 is a schematic diagram of another communication apparatus according to an embodiment of this disclosure. The apparatus is configured to implement the steps performed by the corresponding application function network element in the foregoing method embodiments. As shown in FIG. 12, the apparatus 1200 includes a sending unit 1210 and a receiving unit 1220.

The sending unit 1210 is configured to send, to a first network element, a first request for requesting to obtain information about a first policy control network element, where the first policy control network element is a policy control network element that provides mobility management. The receiving unit 1220 is configured to receive the information about the first policy control network element from the first network element.

In a possible implementation, the first request includes an address of a terminal device and a policy-control-network-element type, and the policy-control-network-element type indicates a policy control network element that provides mobility management. That the first request is used to request to obtain information about a first policy control network element includes: The first request is used to request to obtain the information that is about the first policy control network element and that corresponds to the address of the terminal device.

In a possible implementation, the first request includes an identifier of a terminal device. That the first request is used to request to obtain information about a first policy control network element includes: The first request is used to request to obtain the information that is about the first policy control network element and that corresponds to the identifier of the terminal device.

In a possible implementation, the first network element is a binding support function network element, a unified data management network element, a unified data repository, or a second policy control network element. The second policy control network element is a policy control network element that provides session management.

Optionally, the communication apparatus 1200 may further include a storage unit. The storage unit is configured to store data or instructions (which may also be referred to as code or a program). The foregoing units may interact with or be coupled to the storage unit, to implement a corresponding method or function. For example, the processing unit may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the unit in any one of the foregoing apparatuses may be one or more integrated circuits configured to implement the foregoing methods, for example, one or more ASICs, one or more DSPs, one or more FPGAs, or a combination of at least two of the integrated circuit forms. For another example, when the unit in the apparatus may be implemented in a form in which a processing element invokes a program, the processing element may be a general-purpose processor, for example, a CPU or another processor that can invoke the program. For another example, the units may be integrated and implemented in a form of a SoC.

The receiving unit 1220 is an interface circuit of the apparatus, and is configured to receive a signal from another apparatus. For example, when the apparatus is implemented by a chip, the receiving unit 1220 is an interface circuit that is of the chip and that is configured to receive a signal from another chip or apparatus. The sending unit 1210 is an interface circuit of the apparatus, and is configured to send a signal to another apparatus. For example, when the apparatus is implemented by a chip, the sending unit 1210 is an interface circuit that is of the chip and that is configured to send a signal to another chip or apparatus.

Figure 13:
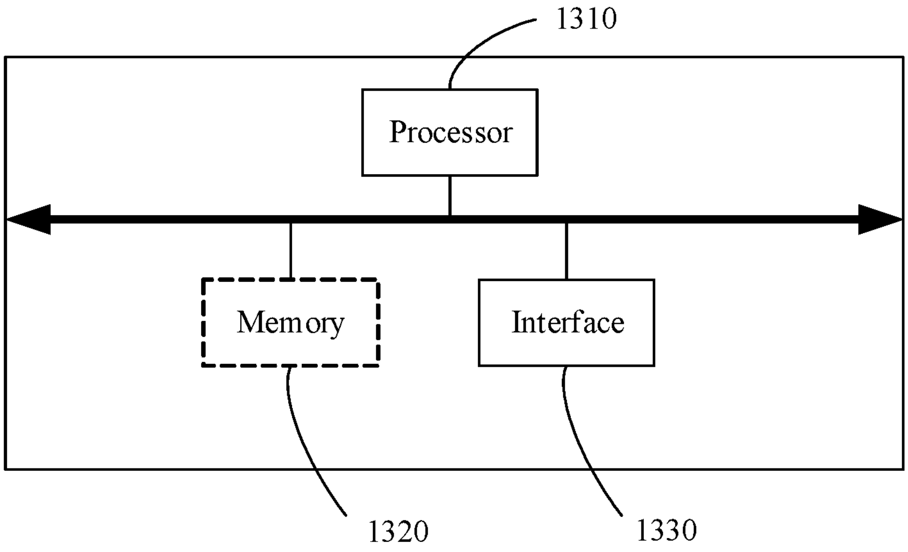
FIG. 13 is a schematic diagram of another communication apparatus according to an embodiment.

FIG. 13 is a schematic diagram of another communication apparatus according to an embodiment of this disclosure. The communication apparatus is configured to implement an operation of the first network element or the application function network element in the foregoing embodiments. As shown in FIG. 13, the communication apparatus includes a processor 1310 and an interface 1330. Optionally, the communication apparatus further includes a memory 1320. The interface 1330 is configured to implement communication with another device.

The method performed by the first network element or the application function network element in the foregoing embodiments may be implemented by the processor 1310 by invoking a program stored in a memory (which may be the memory 1320 in the first network element or the application function network element, or may be an external memory). To be specific, the apparatus used in the first network element or the application function network element may include the processor 1310. The processor 1310 invokes the program in the memory, to perform the method performed by the first network element or the application function network element in the foregoing method embodiments. The processor herein may be an integrated circuit having a signal processing capability, for example, a CPU. The apparatus used in the first network element or the application function network element may be implemented by one or more integrated circuits configured to implement the foregoing methods, for example, one or more ASICs, one or more microprocessors DSPs, one or more FPGAs, or a combination of at least two of the integrated circuit forms, that implement the foregoing methods. Alternatively, the foregoing implementations may be combined.

The processor 1310 in the communication apparatus 1300 shown in FIG. 13 may invoke computer-executable instructions stored in the memory 1320 to implement a function/an implementation process of the sending unit 1110, the receiving unit 1120, and the processing unit 1130 in FIG. 11. Alternatively, the processor 1310 in the communication apparatus 1300 shown in FIG. 13 may invoke computer-executable instructions stored in the memory 1320 to implement a function/an implementation process of the processing unit 1130 in FIG. 11, and a function/an implementation process of the sending unit 1110 and the receiving unit 1120 in FIG. 11 may be implemented through the interface 1330 in the communication apparatus 1300 shown in FIG. 13.

The processor 1310 in the communication apparatus 1300 shown in FIG. 13 may invoke computer-executable instructions stored in the memory 1320, to implement a function/an implementation process of the sending unit 1210 and the receiving unit 1220 in FIG. 12. Alternatively, a function/an implementation process of the sending unit 1210 and the receiving unit 1220 in FIG. 12 may be implemented through the interface 1330 in the communication apparatus 1300 shown in FIG. 13.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits in embodiments of this application may implement or operate the functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may be integrated into a processor. The processor and the storage medium may be disposed in the ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In one or more exemplary designs, the functions described in this disclosure may be implemented by using hardware, software, firmware, or any combination thereof If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compact disc, a laser disc, an optical disc, a digital versatile disc (DVD for short), a floppy disk, and a Blu-ray disc. The disc usually copies data by a magnetic means, and the disk optically copies data by a laser means. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a special-purpose computer.

In the foregoing illustrative implementations, the objectives, technical solutions, and beneficial effects of this disclosure are further described in detail. It should be understood that the foregoing descriptions are merely illustrative implementations of this disclosure, but are not intended to limit the protection scope of this accompanying claims. Any modification, equivalent replacement, improvement, or the like made based on the technical solutions of this disclosure shall fall within the protection scope of the claims. According to the foregoing description of this disclosure, technologies in the art may use or implement the content of this disclosure. Any modification based on the disclosed content shall be considered obvious in the art. The basic principles described in this disclosure may be applied to other variations without departing from the essence and scope of this disclosure. Therefore, the content disclosed in this disclosure is not limited to the described embodiments and designs but may also be extended to a maximum scope that is consistent with the principles and disclosed new features disclosed herein.

Although this disclosure is described with reference to specific features and embodiments thereof, it is clear that various modifications and combinations may be made to them without departing from its spirit and scope. Correspondingly, this specification and the accompanying drawings are merely illustrative of the features defined by the appended claims, and are considered, as any of or all modifications, variations, combinations or equivalents that cover the scope of this disclosure. A person skilled in the art can make various modifications and variations to this disclosure without departing from the scope of this disclosure. This disclosure is intended to cover these modifications and variations that fall within the scope defined by the following claims and their equivalent technologies.

What is claimed is:

1. A communication method, comprising:

receiving, by a first network element from an application function network element, a first request comprising identification information of a terminal device, the identification information is a subscription permanent identifier (SUPI) of the terminal device, wherein the first network element stores information of a policy control network element that provides mobility management for the terminal device and information of a policy control network element that provides session management for the terminal device;

determining, by the first network element in response to the SUPI of the terminal device in the first request and in the absence of indication from the application function network element as to whether a policy control network element that provides mobility management for the terminal device or a policy control network element that providing session management for the terminal device is requested, the policy control network element requested by the application function network element is the policy control network element that provides mobility management for the terminal device and not the policy control network element that provides session management for the terminal device; and sending, by the first network element to the application function network element, information about the policy control network element that provides mobility management and not the policy control network element that provides session management for the terminal device in response to the determining that a policy control network element requested by the application function network element is a policy control network element that provides mobility management for the terminal device, and not the policy control network element that provides session management for the terminal device.

2. The communication method according to claim 1, further comprising:

receiving, by the first network element, a registration request from the policy control network element, the registration request comprising registration information including information about the policy control network element and the identification information, the first network element being configured to process the registration request.

3. The communication method according to claim 2, further comprising:

obtaining, by the first network element, the information about the policy control network element from the registration information corresponding to the identification information.

4. The communication method according to claim 1, wherein the information about the policy control network element comprises an address of the policy control network element.

5. The communication method according to claim 1, wherein the policy control network element is an access and mobility policy control network element.

6. The communication method according to claim 1, wherein the first network element is a binding support function (BSF).

7. A communication apparatus, comprising:

at least one processor; and a non-transitory computer-readable storage medium storing a program including instructions that, when executed by the at least one processor, causes the communication apparatus to:

receive, from an application function network element, a first request comprising identification information of a terminal device, the identification information is a subscription permanent identifier, SUPI of the terminal device, wherein the first network element stores information of a policy control network element that provides mobility management for the terminal device and information of a policy control network element that provides session management for the terminal device;;

determine, in response to the SUPI of the terminal device in the first request and in the absence of indication from the application function network element as to whether a policy control network element that provides mobility management for the terminal device or a policy control network element that providing session management for the terminal device is requested, the policy control network element requested by the application function network element is a policy control network element that provides mobility management for the terminal device and not the policy control network element that provides session management for the terminal device; and send, to the application function network element, information about the policy control network element that provides mobility management and not the policy control network element that provides session management for the terminal device in response to the determining that a policy control network element requested by the application function network element is a policy control network element that provides mobility management.

8. The communication apparatus according to claim 7, wherein the instructions, when executed by the at least one processor, cause the communication apparatus to:

receive a registration request from the policy control network element, the registration request comprising registration information including information about the policy control network element and the identification information, the first network element being configured to process the registration request.

9. The communication apparatus according to claim 8, wherein the instructions, when executed by the processor, cause the communication apparatus to:

obtain the information about the policy control network element from the registration information corresponding to the identification information.

10. The communication apparatus according to claim 7, wherein the information about the policy control network element is an address of the policy control network element.

11. A communication method, comprising:

sending, by an application function network element, a first request to a first network element, the first request comprising identification information of a terminal device, the identification information is a subscription permanent identifier, SUPI of the terminal device;

determining, by the first network element in response to the SUPI of the terminal device in the first request and in the absence of indication from the application function network element as to whether a policy control network element that provides mobility management for the terminal device or a policy control network element that providing session management for the terminal device is requested, the a policy control network element requested by the application function network element is a policy control network element that provides mobility management for the terminal device and not the policy control network element that provides session management for the terminal device;

sending, by the first network element to the application function network element, information about the policy control network element that provides mobility management for the terminal device, and not the policy control network element that provides session management for the terminal device in response to the determining that a policy control network element requested by the application function network element is a policy control network element that provides mobility management for the terminal device, and not the policy control network element that provides session management for the terminal device; and receiving, by the application function network element, the information about the policy network element.

12. The communication method according to claim 11, further comprising:

sending, by the policy control network element, a registration request to the first network element, the registration request comprising registration information, the registration information including information about the policy control network element and the identification information, the first network element being configured to process the registration request; and receiving, by the first network element, the registration request from the policy control network element.

13. The communication method according to claim 12, further comprising:

obtaining, by the first network element, the information about the policy control network element from the registration information corresponding to the identification information.

14. The communication method according to claim 11, wherein the information about the policy control network element is an address of the policy control network element.

15. The communication method according to claim 11, wherein the policy control network element is an access and mobility policy control network element.

16. A communication system, comprising:

an application function network element configured to:

send a first request to a first network element, wherein the first request comprises identification information of a terminal device, the identification information is a subscription permanent identifier, SUPI of the terminal device; and the first network element is configured to:

determine, in response to the SUPI of the terminal device in the first request and in the absence of indication from the application function network element as to whether a policy control network element that provides mobility management for the terminal device or a policy control network element that providing session management for the terminal device is requested, the a policy control network element requested by the application function network element is a policy control network element that provides mobility management for the terminal device and not the policy control network element that provides session management for the terminal device; and send, to the application function network element, information about the policy control network element that provides mobility management for the terminal device, and not the policy control network element that provides session management for the terminal device in response to the determining that a policy control network element requested by the application function network element is a policy control network element that provides mobility management for the terminal device, and not the policy control network element that provides session management for the terminal device.

17. The communication system according to claim 16, wherein the policy control network element is configured to:

send a registration request to the first network element, the registration request comprising registration information including information about the policy control network element and the identification information, first network element being configured to process the registration request; and the first network element is configured to:

receive the registration request from the policy control network element.

18. The communication system according to claim 16, wherein the first network element is configured to:

obtain the information about the policy control network element from the registration information corresponding to the identification information.

19. The communication system according to claim 16, wherein the information about the policy control network element is an address of the policy control network element.

* * * * *